(12) United States Patent
Karpinski et al.

(10) Patent No.: US 9,131,645 B2
(45) Date of Patent: Sep. 15, 2015

(54) METHOD AND APPARATUS FOR IMPROVING GROWTH AND/OR PATHOGEN RESISTANCE OF A PLANT USING TRANSIENT HIGH-INTENSITY ILLUMINATION

(76) Inventors: Stanislaw Karpinski, Poznan (PL); Magdalena Szechynska-Hebda, Cracow (PL)

( * ) Notice: Subject to any disclaimer, the term of this patent is extended or adjusted under 35 U.S.C. 154(b) by 365 days.

(21) Appl. No.: 13/703,404

(22) PCT Filed: Jun. 10, 2011

(86) PCT No.: PCT/EP2011/059682
§ 371 (c)(1),
(2), (4) Date: Jun. 21, 2013

(87) PCT Pub. No.: WO2011/154522
PCT Pub. Date: Dec. 15, 2011

(65) Prior Publication Data
US 2013/0255150 A1    Oct. 3, 2013

(30) Foreign Application Priority Data
Jun. 11, 2010    (GB) .................................. 1009773.1

(51) Int. Cl.
*A01G 7/04*    (2006.01)
*A01G 7/02*    (2006.01)
*F21V 9/00*    (2015.01)

(52) U.S. Cl.
CPC .. *A01G 7/045* (2013.01); *F21V 9/00* (2013.01)

(58) Field of Classification Search
CPC ........... A01G 7/04; A01G 7/045; A01G 9/20; A01G 9/26

USPC .......................................... 47/58.1 R, 58.1 LS
See application file for complete search history.

(56) References Cited

U.S. PATENT DOCUMENTS 5,269,093 A * 12/1993 Horaguchi et al. ........ 47/58.1 R
8,858,607 B1 * 10/2014 Jones .............................. 607/88
(Continued)

FOREIGN PATENT DOCUMENTS

EP    0799564 A1    10/1997
FR    2542567    9/1984
(Continued)

OTHER PUBLICATIONS

International Search Report for corresponding International Application No. PCT/EP2011/001335 mailed Oct. 17, 2011.
(Continued)

*Primary Examiner* — Monica Williams
*Assistant Examiner* — Marc Burgess
(74) *Attorney, Agent, or Firm* — Renner, Otto, Boisselle & Sklar, LLP

(57) ABSTRACT

A method of improving the growth and/or pathogen resistance of a plant, comprising the step of exposing at least part of the plant to a transient period of high intensity illumination providing a photon flux at the plant surface having at least one of the following characteristics: (a) a red photon flux comprising at least 100 micromoles photons per square meter per second, and having a wavelength of between 600 and 700 nm; (b) a blue photon flux comprising at least 100 micromoles photons per square meter per second, having a wavelength of between 420 and 480 nm. The Invention also provides apparatus for providing such conditions to growing plants.

23 Claims, 2 Drawing Sheets

(56) References Cited

U.S. PATENT DOCUMENTS

| | | | |
|---|---|---|---|
| 2003/0126791 A1* | 7/2003 | Weder | 47/17 |
| 2004/0109302 A1* | 6/2004 | Yoneda et al. | 362/2 |
| 2007/0089359 A1* | 4/2007 | Okabe et al. | 47/39 |
| 2008/0292735 A1* | 11/2008 | Hashimoto et al. | 424/751 |
| 2009/0272029 A1* | 11/2009 | Aiking et al. | 47/58.1 LS |
| 2009/0280223 A1* | 11/2009 | Scott | 426/237 |
| 2010/0043096 A1* | 2/2010 | Liu et al. | 47/58.1 LS |

FOREIGN PATENT DOCUMENTS

| | | |
|---|---|---|
| GB | 2382014 | 5/2003 |
| GB | 2402037 | 12/2004 |
| GB | 2437171 A | 10/2007 |
| JP | 2007068512 | 3/2007 |
| JP | 2007202471 A | 8/2007 |
| WO | 2004/100684 | 11/2004 |
| WO | 2007032101 A1 | 3/2007 |
| WO | 2007037023 A1 | 4/2007 |

OTHER PUBLICATIONS

Search Report for corresponding Great Britain Application No. GB1009773.1 mailed Jan. 18, 2011.

Dougher Tracy A 0 et al, "Evidence for yellow light suppression of lettuce growth", Photochemistry and Photobiology, 2001, 73 (2),208-212.

Ohashi-Kaneko Keiko et al, "Effect of light quality on growth and vegetable quality in Leaf Lettuce, Spinach and Komatsuna", Environment Control in Biology, 2007, 45 (3), 189-198.

* cited by examiner

METHOD AND APPARATUS FOR IMPROVING GROWTH AND/OR PATHOGEN RESISTANCE OF A PLANT USING TRANSIENT HIGH-INTENSITY ILLUMINATION

This application is a national phase of International Application No. PCT/EP2011/059682 filed Jun. 10, 2011 and published in the English language.

FIELD OF THE INVENTION

This invention relates to methods and apparatus for the protection of plants from infection by pathogens, and for improving the growth characteristics of plants.

BACKGROUND AND PRIOR ART KNOWN BY THE APPLICANTS

Nowadays smart energy management plays an important role in industrial indoor plant cultivations. Conventional light-systems and light programs, which are commonly used in greenhouses are not optimized for plant growth. Such artificial light systems have fixed light intensity and spectral composition of light. Moreover, over 80% of the spectral energy produced by such lamps is useless for photosynthesis, for induction of defence mechanisms and consequent growth, therefore this energy is wasted. One major difference between sunlight and artificial indoor plants cultivation-system is flexible light intensity and quality (spectral composition) that usually operate in the nature. In natural conditions plants are exposed to daily and seasonally variable light intensity and light spectral composition and sometimes to the ozone stress. Moreover indoor cultivated plants are never exposed to moderate ozone as found in natural conditions. It is also well known that indoor cultivated plants have lower nutritional, flavour and taste values for the consumers than plants cultivated outdoors.

Microorganisms, especially bacteria cause the most widespread plant diseases. These pathogens are able to survive and cause diseases under a wide range of environmental conditions. They are origins of major damage to economically important plants, sources of seedling blight (high mortality of seedlings), stem rot, leaf blotch etc. The present invention therefore is focused on the resolving the problem: how to grow plants (in greenhouse conditions) able to cope with pathogen infection in sustainable and low input agriculture systems and not to reduce their grow or yield. The invention will lead to use of the natural components of active plant defense (specific resistance capabilities) trigged by wavelengths of light of certain wavelength and the components of the cross-tolerance in which exposure to light can burst innate immunity. Thus both producers and consumers will benefit from invention, because novel methods of plant protection could result in lowering usage of chemicals (pesticides, fungicides and other) thus will protect environment and their application will have impact on human health.

It is known that the application of light from the UV spectrum (wavelengths shorter than visible light) is a highly effective method of destroying microorganisms. At certain wavelengths UV is mutagenic to bacteria, viruses and other microorganisms e.g. at a wavelength of 254 nm [4] UV will break the molecular bonds within micro-organismal DNA, producing thymine dimers in their DNA thereby destroying them, rendering them harmless or prohibiting growth and reproduction. However, UV-B and UV-C is problematic to handle for humans and is heavily implicated in cancerous disease processes. As such, UV-B and UV-C light is considered potentially harmful to healthy mammalian tissue and is considered hazardous to use. Moreover, UV is cannot be used to direct exposure for plant in case that it promotes cell and tissue death and changes the plant metabolism in unwanted and useless way. Although observations concerning light-destroying microorganisms have been reported on the effects of certain bands of UV light, the available data suggest the UV effect appears to be silent by plant cells or tissue and tissues could be damaged. Than effect of pathogen elimination from tissue can be improved with light of other wavelengths, that are more efficient for plants and moreover useful for their effective photosynthesis e.g. from the white light or visible spectrum.

Plants are vulnerable to ozone stress. Acute exposure can induce chlorosis, apoptosis and necrotic lesions, whereas accelerated leaf senescence has been observed in chronic exposure. As a mechanism for ozone-induced damages, the generation of ROS (Reactive Oxygen Species) such as superoxide and hydrogen peroxide, follow by induction of natural gaseous hormone ethylene, resulting from ozone degradation in the apoplast, has been proposed and described, though, the complete mechanism of interaction is not yet known. After penetration through the open stomata, a large part of the ozone interacts with components of the extracellular matrix. The first line of defense is the extracellular ascorbate and glutathione pool, which becomes oxidized by ozone and its reactive derivates. The antioxidant ascorbate and glutathione (reduced form) accumulates as millimolar concentrations in leaf apoplasts and may react and scavenge significant amounts of ozone derived ROS. Ascorbic acid is then recycled inside the cell in a glutathione dependent manner and transferred out through the plasma membrane to the extracellular space. The oxidation of intracellur glutathione induces the expression of several genes, some of which are associated, not only with antioxidant defense, but with abiotic stress responses and with growth and development cessation. As a result changes induced by the ozone influence the plant's metabolism as a whole Exposure of plants to over 70 ppb of ozone results in changes in the intracellur concentration of $Ca^{2+}$. This indicates oxidative activation of $Ca^{2+}$ channels, similar to the response to abscisic acid-induced (ABA) increased $H_2O_2$, which causes the closure of the stomata. Oxidative activation of redox dependent $Ca^{2+}$ channels, results in changes in the protein phosphorylation pattern. One of the earliest phosphorylated proteins found in experiments on rice seedlings, due to ozone fumigation, is the 66 kDa ERK-type MAPK (mitogen activated protein kinase). Ozone-induced phosphorylation stabilizes the enzyme, which in turn increases the kinase activity. Furthermore, nonenzymatic or lipoxygenase-mediated break down of lipids, ROS (in particular $H_2O_2$ as diffusible messenger), modulation of cytosolic ascorbate and glutathione relations, respectively, are well established regulatory and signalling compounds and may represent other routes of $O_3$ triggered signalling, from the site of the chemical reaction of $O_3$ in the apoplast or plasma membrane to the cytosol.

It is among the objects of the present invention to provide methods and apparatus that improve the resistance of plants to infection by plant pathogens, and to improve their growth characteristics by manipulation of the plant to the effects of light.

SUMMARY OF THE INVENTION

Accordingly, the invention provides a method of improving the growth and/or pathogen resistance of a plant, said method comprising the step of exposing at least part of said plant to a transient period of high intensity illumination, said high-intensity illumination providing a photon flux at the plant surface having at least one of the following characteristics:

(a) a red photon flux comprising at least 1 micromoles photons per square meter per second, said photons having a wavelength of between 600 and 700 nm;
(b) a blue photon flux comprising at least 1 micromoles photons per square meter per second, said photons having a wavelength of between 420 and 480 nm;

and wherein said transient period has a duration of at least 10 seconds; and
wherein at least 50% of the energy of the illuminating light falls within said definitions of red photon flux and/or blue photon flux.

In preferred embodiments, each red and blue photon flux comprises at least 10 micromoles photons per square meter per second, and preferably at least 100 micromoles photons per square meter per second.

Also in preferred embodiments, at least 60%, and preferably 70%, 80%, 90% and 100% of the energy of the illuminating light falls within said definitions of red photon flux and/or blue photon flux. Concentrating the energies in these wavelength bands has the advantage that levels of other light wavelengths, and especially ultraviolet (UV) and infra-red (IR) light. High levels of UV can accelerate cell death, whilst high levels of IR can induce dormancy in the plant.

In preferred embodiments, said red photon flux comprises at least 5 and preferably 25, 50, 100, 200, 400 or 800 micromoles photons per square meter per second. Higher intensities lead to faster induction of the effects described herein.

Also in preferred embodiments, said red photon flux comprises photons having a wavelength of between 620-690 nm, more preferably between 620-680 nm, and most preferably between 640-660 nm Also in preferred embodiments, said blue photon flux comprises at least 10 and preferably 50, 100, 200, 400 or 800 micromoles photons per square meter per second. Again, such higher intensities lead to faster induction of the effects described herein.

It is particularly preferred that the illumination combines both high intensity red and blue photon fluxes.

The inventors have found that such a period of high intensity illumination surprising induces an immunity to infection by plant pathogens (after removal of the light source) and has advantages in respect of the plant growth rate. A number of biochemical markers have been found by the inventors that exemplify and possibly explain these hitherto unknown effects are described herein.

The length of the transient period providing an effect is to a certain extent dependent on the intensity of the light employed. Whilst a short period such as 10 seconds is sufficient to induce the effect, especially at high light levels, longer periods produce a more intense and longer-lasting effect. Periods of non-illumination (i.e. just the ambient light that might be present in a commercial greenhouse) are interspersed between the transient high-intensity light. It is envisaged that the transient periods would typically last for no more than six hours.

In any aspect of the invention, it is preferred that said transient period has a duration of at least one minute, and preferably 5 minutes, 20 minutes, 1 hour, 2.5 hours, 5 hours or 10 hour. It is envisaged that such periods of high intensity illumination are provided to the growing plant once in each day (or in each normal photoperiod), but may be spaced out, for example every other day, or every 3-4 days.

Also in any aspect of the invention, it is preferred that said illumination is provided from an electrically-powered source. In this way, the illumination is under direct control of the plant grower, which gives opportunity for better control, as is described herein.

Also in any aspect of the invention, it is preferred that the method further comprises the step of measuring one or more photosystem II efficiencies of the plant, selected from the group consisting of:

(a) photosystem II operating efficiency ($F_q'/F_m'$);
(b) photosystem II maximal photochemical efficiency ($F_v'/F_m'$); and
(c) photosystem II efficiency factor ($F_q'/F_v'$);

and manipulating the photon flux to control one or more of said efficiencies to a desired level.

Methods for measuring such photochemical electron transfer efficiency are known to the skilled addressee, and are described e.g. in Maxwell and Johnson, (J. Exp. Botany, 51(345), 659-668, 2000) and in Baker. ('Chlorophyll fluorescence: a probe of photosynthesis in vivo'. Ann Rev. Plant Biol. 59: 89-113, 2008). Baker refers to photochemical electron transfer efficiency as "ΦPSII operating efficiency" or "ΦPSII efficiency factor" given in the paper as (Fq'/Fm'), but the measures are the same, and methods for measuring the parameter are given.

The aim of the method is to increase ΦPSII above the basal level produced in ambient light conditions, which may typically be as low as 0.2. In preferred embodiments, the method is such that the said desired level to be achieved by the control system is at least 0.2, and preferably at least 0.3, 0.4, 0.5, 0.6, 0.7, 0.8 or even 0.9.

Whilst a number of methods for measuring such ΦPSII efficiencies are known, it is particularly preferred that in the method of the invention said photochemical electron transfer efficiency (ΦPSII) is measured by measurement of chlorophyll fluorescence. This may be carried out non-invasively by use of a camera probe, thereby making it non-contact, non-destructive, and particularly suitable for use in a control system.

Methods of controlling light intensity from measured and calculated ΦPSII efficiencies may be implemented by means of e.g. a suitably-programmed microcomputer, or by a dedicated control unit. For example, a feedback scheme such as PID (proportional, integral, derivative) control or an adaptive control algorithm may be implemented. Thus use of such a control systems can minimise energy consumption and adverse affects on the plants, whilst triggering the required response.

In any aspect of the methods of the invention is it also particularly preferred that the method further comprises the step of increasing the carbon dioxide concentration surrounding the plant during said period of high intensity illumination. The inventors have found that this stimulates the response of the plant, which can also use such elevated $CO_2$ concentrations for photosynthesis by virtue of the high illumination in the photosynthetic wavelength range. Preferably, said carbon dioxide concentration is increased to at least 0.05%, and more preferably to at least 0.1%, 0.125%, 0.15%, 0.2% or 0.25%.

Also in any aspect of the invention, it is particularly preferred that the method further comprises the step of increasing the $HCO_3^-$ ion concentration surrounding the plant roots during said period of high intensity illumination. This may be achieved by e.g. spraying $HCO_3^-$ ions in solution onto the plant, or directly around its roots. Preferably, the $HCO_3^-$ ion concentration surrounding the plant roots during said period of high intensity illumination is raised to at least 0.5 mM, and more preferably 1, 2, 4, or 8 mM.

Also in any aspect of the methods of the invention is it particularly preferred that the method further comprises the step of increasing the ozone concentration surrounding the plant during said period of high intensity illumination. The inventors have found that the presence of ozone (whilst known in itself to produce a reduction in infection) has a synergistic effect with the illumination to produce much improved pathogen resistance. In such methods, it is particularly preferred that said ozone concentration is increased to at least 12 ppm (parts per million), and preferably at least 25 ppm, 50 ppm, or 75 ppm.

The inventors have also found that by changing the ratio of red photon flux to blue photon flux outside that normally encountered in "white" light, particular benefits are obtained in respect of increasing disease resistance and for growth ameliorations in different plants.

Accordingly, therefore, in any aspect of the invention in which both a red photon flux and a blue photon flux is provided, it is preferred that the ratio of red photon flux to blue photon flux is more than 2:1. Preferably the ratio of red photon flux to blue photon flux is more than 5:1 and more preferably 10:1, 20:1 or 50:1.

Also in any aspect of the invention in which both a red photon flux and a blue photon flux is provided, it is preferred that the ratio of blue photon flux to red photon flux is more than 2:1. Preferably the ratio of blue photon flux to red photon flux is more than 5:1 and more preferably 10:1, 20:1 or 50:1.

Also included within the scope of the invention is apparatus for performing a method of the invention, comprising a light source for providing said high intensity illumination.

Preferably said apparatus further comprises a sensor to measure the photochemical electron transfer efficiency ($\Phi$PSII) of the plant, and a controller to control light intensity in response to measured $\Phi$PSII. Such a sensor might comprise a probe camera for measuring chlorophyll fluorescence and a computer programmed to control the light intensity in response to measured or deduced $\Phi$PSII.

In any aspect of the invention it is preferred that the apparatus further comprises a carbon dioxide delivery system for increasing the local $CO_2$ concentration in the region of the plant being exposed to the high-intensity illumination.

Also in any aspect of the invention it is preferred that the apparatus further comprises an ozone delivery system for increasing the local $O_3$ concentration in the region of the plant being exposed to the high-intensity illumination.

In any aspect of the invention it is preferred that the apparatus further comprises a bicarbonate delivery system for increasing the local $HCO_3^-$ concentration in the region of the plant being exposed to the high-intensity illumination.

Also in any aspect of the invention it is preferred that the apparatus further comprises a propulsion system to move said apparatus relative to plants to be treated. In this way, the transient illumination may be provided by moving the apparatus relative to growing plants, e.g. along rows of plants in a commercial greenhouse. The speed of movement relative to the plants, and the illuminated area, thereby determine the length of the illumination transient. Some commercial greenhouse crops (such as tomatoes and cucumbers) are grow in a largely vertical fashion, and it is particularly preferred, therefore, that such apparatus is configured to illuminate the plants from the side, rather than the top, i.e. the direction of illumination is largely horizontal.

Where very tall plants are grown, it is particular preferred that the apparatus is configured to allow the illumination element (and preferably any gas delivery elements as well) to be moved in a vertical direction as well as being propelled in a largely horizontal direction. In this way, a relatively small unit (by comparison with the height of the growing plant) may be employed, thereby saving costs and allowing the motion of the apparatus to be configured to match the physical dimensions of various crops as well as the changing dimensions of the stands of crops as the plant develop.

BRIEF DESCRIPTION OF THE DRAWINGS

The invention will be described with reference to the accompanying drawings in which.

DISCUSSION AND DESCRIPTION OF PREFERRED EMBODIMENTS

Figure 1:
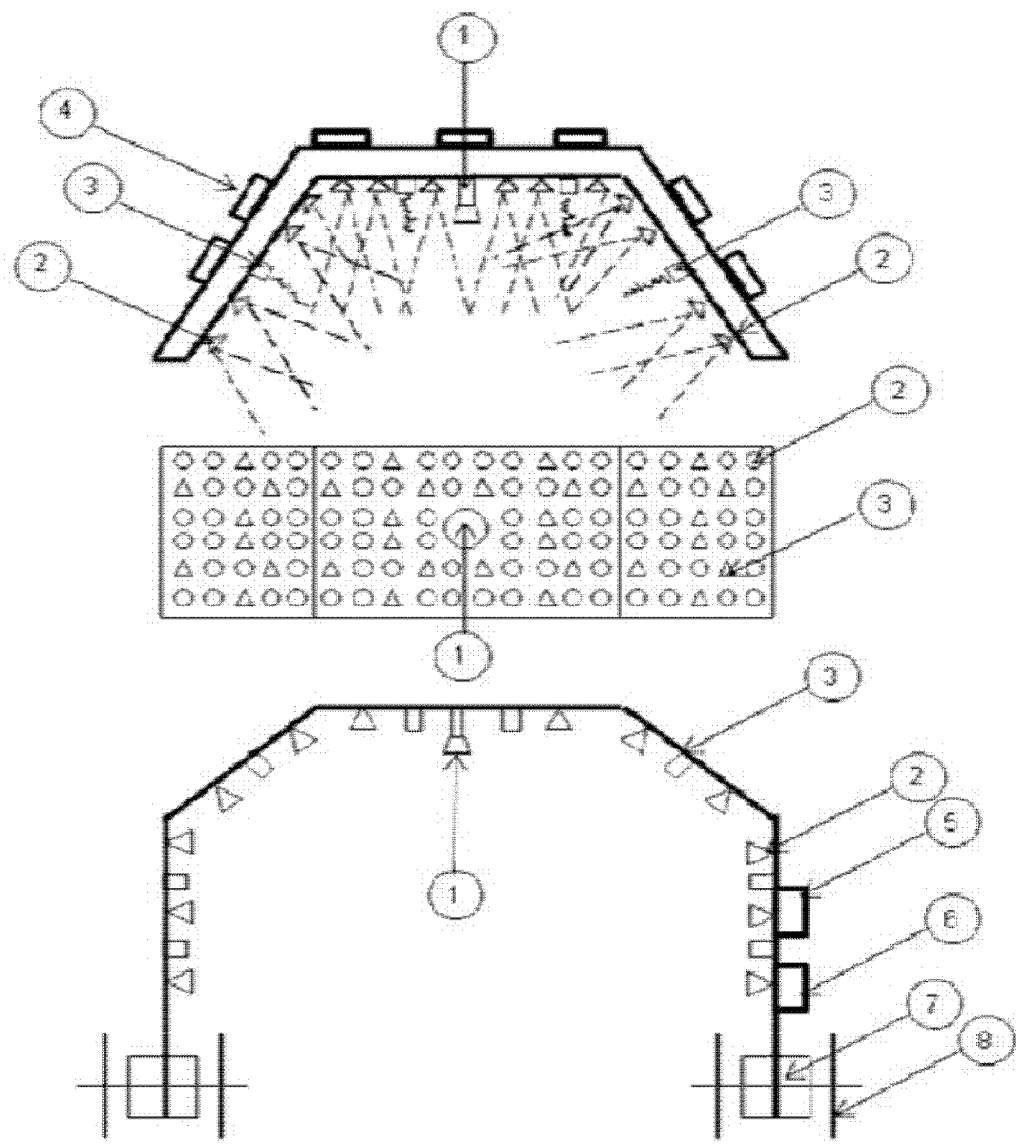
FIG. 1 shows, in schematic view, an embodiment of apparatus according to the present invention.

When plant leaves are exposed to full sunlight only a portion of absorbed light energy is used for $CO_2$ fixation (Asada, 1999; Karpinski et al., 1999). Environmental stresses, like sudden increase in light intensity, changes in temperature or limitation in water accessibility, depress efficiency of $CO_2$ assimilation due to reduction of stomatal conductance, but do not depress foliar absorption of light energy (e.g. Niyogi, 2000; Mullineaux and Karpinski, 2002; Holt et al., 2004; Baker, 2008). It results in an increase of the excitation energy in excess (EEE) over that required for optimal photosynthetic metabolism. In the classical view, the failure to dissipate EEE can be highly damaging to plants and often manifests as chlorosis, bleaching or bronzing of leaves due to imbalanced reactive oxygen species (ROS) metabolism (e.g. Karpinski et al., 1999; Niyogi, 2000; Apel and Hirt, 2004; Laloi et al., 2007; Mühlenbock et al., 2008; Van Breusegem et al., 2008). However, plants are able to integrate inputs, process and prioritize their outputs to survive and propagate in a hostile environment. Here we show that local and systemic response to excess light episode is associated with systemic changes in the nonphotochemical quenching (NPQ) and ROS levels. Excess light episodes are physiologically memorized in leaves and the cellular light memory effect is specific for an excess of blue (450±20 nm) and red (650±20 nm) light of similar energy. It is concluded that plants possess complex and dynamic light training and memorizing system that is used to optimize light acclimation and immunedefenses.

Before the teaching of the present invention state of the art indicated that plants evolved separate genetic and molecular mechanisms that regulate biotic and abiotic defenses and stress responses respectively (Dangl and Jones 2001; Galvez-Valdivieso et al., 2009). Our invention demonstrates that exposure to selected wavelengths of red light (650±20 nm) or excess of blue or white light is able to induce light acclimation (SAA) and immunedefenses (SAR). Here we have to ask; why do plants evolve mechanism in which physiologically memorized excess light and its spectral composition regulate immunedefenses? A straightforward answer to this question is difficult, and several answers could be given. One possible answer is that in dense canopy, light intensities are strongly reduced, therefore majority of leaves being in shade (low or very low light) are prone to e.g. pathogen attack (see experimental part). Systemic acquired acclimation (SAA) is in fact a mechanism in which plants utilize disadvantages of being partly exposed to excess light (condition that generates EEE) for strengthening, for example, immunedefenses in dense canopy zone. This explains why plants possess natural capacity to absorb more light energy then that required for photosynthesis and are able to physiologically memorize it. They need this memorized excess energy episode for optimization of acclamatory and immunedefense responses of a whole plant. The present invention is based on discovery of the excess light memory in plants, which will allow to use proposed light apparatus, for example, only for several minutes or hours per one-week or longer period.

In fact, excess light episodes memorized in different cells and plant organs are complex and dynamic training system of naive cells, chloroplasts and PSII, that did not experience excess light episodes in theirs life by cells, chloroplasts and PSII that were experiencing such conditions. Our invention demonstrates that changes in NPQ are prerequisites for light acclimation, immunedefenses and survival in the natural fluctuating light environment. Systemic reduction of NPQ correlates with increase of $H_2O_2$ therefore systemic changes in NPQ and other chlorophyll fluorescence parameters must be an active and physiologically regulated process. Such systemic changes in NPQ must be induced by systemic changes in the chloroplast lumen acidification and subsequent activation of the xanthophyll cycle, and in a consequence this must induce ROS/hormonal response loops.

Our proposed invention is teaching that single cells, plants parts or organs are able to differentially memorize for several days or weeks, different excess light incidents, spectral composition of light and effectively use this memorized information for improving their survival chances (growth and immunedefenses) of a whole plant. FR 3542567 describes the application of blue and/or red light to certain fruits, typically un-harvested fruits, at night for periods of long duration measured in days in order to accelerate their ripening. WO 2004/103060 describes the application of white light enriched with blue to harvested plant material that is capable of photosynthesis. Both patents: EP 209054 A2 and US 2007/0151149 A1 describe the invention relates to a method for altering the level of phytochemicals such as plant secondary metabolites in harvested plant cells and/or plant tissue by applying wavelengths of light of certain wavelength and intensity thereto that are selected from wavelengths of light from the white light or visible spectrum and means therefor. The light intensity in these patents lies within the range of 1 to 200 microW/$cm^2$ e.g. 20 microW/$cm^2$ on apple trees treated for 30 nights at 15 minutes per night; about 100 microW/$cm^2$ on apples for 4 hours between 22.00 hrs and 02.00 hrs in the morning. However, that international applications do not allude to the light intensity needed to strike the plant material surface, FR 3542567, USA 20070151149, Ser. No. 10/558,128, EP2090154, Application number: EP20090006306 20040524, Priority numbers: EP20040734541; GB20030011953; GB20030011954, do not teach that the certain light wavelength evokes memory effect in plants cell/tissue or organs and do not refer that exposure of only some selected parts of a plant is enough to induce memory effect that will immunize the whole plant. The above prior art do not teach that light memory effect remained in plants cell/tissue for several days or weeks therefore is able to increase effectiveness of light exposure and lower costs of periodic light treatments, and neither does there appear to be a reference to any relationship between the light wavelength and plant health and susceptibility to biotrofic pathogens. However it is possible increased plant/tissue/cell material resistance to pathogen by the simple application of wavelengths of light for relatively short periods of time selected from those wavelengths or bands found in cold light, that is, visible light.

In control leaves under ambient light conditions (200 µmoles of photons $s^{-1}$ $m^{-2}$) infection with the bacterial pathogen *Pseudomonas syringae* pv. tomato (Pst) strain DC3000 disease symptoms are developing and infection is progressing very quick. In the case of plants infected 1 h before excess light incidents (for all sorts of lights used: white, red, blue with similar light energies) disease is progressing even faster than that in control plants. However, in plants infected 1, 8 and 24 h after EEE incidents development of disease symptoms is effectively stopped in all time frames of infection after excess white and red light incidents. In the case of blue light development of disease symptoms is not significant different in comparison to control values in ambient light conditions. Taken together, when plants are infected prior to appropriate excess light incident, virulent bacteria could initiate a process, which can no longer be counteracted by the plant even if excess light is provided later. It looks like that virulent bacteria can erase light memory mechanism if they succeed to infect plants before appropriate excess light incident.

Excess of white and red (650±20 nm wavelength) but not blue (450±20 nm wavelength) light, of the similar provided energy for these different light treatments, is able to induce APX1:LUC and APX2:LUC in directly exposed leaves and in leaves undergoing SAA. Taking into consideration that these two transgenes are robust molecular markers of SAA (Karpinski et al., 1997; 1999; Mullineaux et al., 2000; Fryer et al., 2003; Ball et al., 2004; Chang et al., 2004) it is concluded that red, but not blue light, is the main inducer of SAA. The results of another parameter, such as foliar $H_2O_2$ are in agreement with induction of APX1:LUC and APX2:LUC by read but not by blue light. $H_2O_2$ levels is initially higher directly after all excess light incidents. Four days after incident of excess white light, foliar $H_2O_2$ level is similar to that observed in control plants from ambient light conditions, in the case of blue light, is significantly higher, while for red light is significantly lower.

Similar links for glutathione and salicylic acid synthesis was also demonstrated before (Mateo et al., 2006) and important role of salicylic acid in induction of plant resistance and memorizing effect of excess light incident is known. Plants contain a whole array of cellular and extracellular mechanisms to defend themselves against invading pathogens. We demonstrated that SA and glutathione (GSH) signaling are physiologically and genetically connected and these signaling molecules are important for the activation of defense responses. Both free and bound salicylic acid content is influenced by excess white and red light but not blue wavelength. The content of free salicylic acid in leaves infected with avirulent pathovar of *P. syringae* corresponded to bacteria growth and development. Memory of light incident allows plants induce fast foliar salicylic acid levels under infection even few days after light incident e.g. high and intensive salicylic acid accumulation was observed in leaves infected 8 and 24 h after single excess light incident. Red light and partly white light inhibit bacteria growth 48 hour after infection what is corresponding by parallel lowering salicylic acid content, whereas in blue light pretreated plants the bacterial growth still increase up to 96 h following by salicylic acid accumulation. The lowest accumulation of SA following by higher disease development was detected in control plant. Moreover, red irradiation had also dramatic effects on free SA content in plants infected with other e.g. virulent strains (DC3000) and SA content increased significantly after excess of red and white light in mutants exhibited enhanced level of resistance to bacterial pathogen e.g. dnd1, cpr6.

Taken together, different excess light incidents can be physiologically memorized and that different spectral compositions of light are memorized differently, and that order of events (infections before or after appropriate excess light incidents) is important for induction of the cellular light memory and immunedefenses. It is well known that PSII will be more excited than PSI by excess of red light of 650 nm wavelength, so called light-2 that induce state-2 transition regulated by over reduction of the PQ pool (Larkin et al., 2003; Pascal et al., 2005; Bellafiore et al., 2005; Barneche et al., 2006; Laloi et al., 2007). Excess of blue light (450 nm wavelength) will equally excite PSII and PSI and does not cause overreduction of the PQ pool and it is not able to induce state-2 transition. This is confirmed by the facts that red, but not blue excess light effectively induced APX1:LUC and APX2:LUC and immunedefenses.

According to the present invention there is provided a method of altering the plant resistance to bacterial pathogens in a plant cell comprising chlorophyll or in plant tissue comprising chlorophyll by irradiating the said plant cell or plant tissue with light of at least one wavelength selected from the range of wavelengths of from 400 nm to 700 nm. The invention based on finding of the natural plant abilities to memorizing excess light episodes. A key part of the present invention involved the determination of which light wavelengths would produce best memory effect suitable for altering plant disease resistance. Each plant pigment absorbs light at one or more specific wavelengths. The areas of peak absorption for each pigment are narrow, and the measurements made with pigments concentrated in a test tube are different than those done on living plants. The wavelength of the light used determines it's energy level, with shorter wavelengths having greater energy than longer wavelengths. Thus each absorption peak, measured by the wavelength of light at which it occurs, represents an energy threshold that must be overcome in order for the process to function. In present invention the wavelength of light used may be of a single wavelength within the range of from 400 nm to 700 nm preferably from red spectrum, such that it is capable to memorizing by plants and altered the level of resistance to biotrophic pathogens in a plant cell or in plant tissue, typically memorizing and raising the level of resistance for several days or weeks after exposure over a suitable time interval and at a suitable light intensity. Thus, the skilled addressee will appreciate that the wavelengths of light used in the present invention on plant material such as leaf of plants in greenhouse conditions or green plant cells in culture, according to the method of the invention do not constitute all of the wavelengths of light making up white light, but a selection of them. Furthermore, it is to be understood that the light wavelength employed in the present invention are selected from so-called 'cold light' wavelengths, that is, the light used in the present invention does not comprise UV wavelengths and does not constitute infrared wavelengths, both forms of which are potentially hazardous to use. In a preferred embodiment, the wavelength or band of light used lies in the range of from 420 nm to 700 nm, depending on design and the phytochemical interest. A suitable set of wavelengths that has been found to induce plant memory of excess light episode, mediated and influenced on the level of resistance to pathogens in plant tissue, is from 420 nm-680 nm with a capacity of up to 2000 μmoles/m$^2$ s$^{-1}$ for periods ranging up to 240 minutes or longer depending on design, the light intensity and plant material used. It has now been found that light of a wavelength or a mixture of wavelengths found in the red part of the visible spectrum appears to be particularly memorized and to be suitable for altering the level of resistance to pathogens within plant tissue comprised of a plant cell or plant cells that is/are capable of photosynthesis. The red wavelength may be selected from a wavelength within the range of from 600 nm-700 nm, preferably from 620 nm-690 nm, more preferably from 620 nm-680 nm, and generally at about 650±10 nm. 640-660 nanometers (nm) is the wavelength that drives the engine of the photosynthetic process. The 680 nm wavelength is perhaps closer to the peak absorption wavelength of one of the two chlorophylls found in higher plants. However, at 680 nm the absorption curve of the second chlorophyll is missed, and furthermore the 680 nm has a fair amount of light output above 700 nm, which is known to cause unwanted morphological changes to plants. LEDs of 680 nm output are also rare in the marketplace, making them relatively expensive. The choice of a 640-660 nm first wavelength component is a compromise wavelength commonly used in plant growing research, which supplies energy to both types of chlorophyll without emitting enough light above 700 nm to adversely affect plant growth. White light comprising red and blue spectrum at energy similar to red spectrum only may be employed in the method of the invention. The actual red or white light, their energy and time of exposure may depend on species, age of plant parts and design. Typically, one unit of energy for red light is about 50-200±10 μmol of photones/m$^{-2}$ s$^{-1}$, for example, 120±10 μmol of photones/m$^{-2}$ s$^{-1}$ for 4 h, wavelength=650±10 nm. From such values or approximations the light intensity shone onto plant material such as leaf surfaces may be calculated. Naturally, the skilled addressee will appreciate that depending on the plant cells or plant tissue employed, the length of time that the plant cells or tissue is exposed to light of wavelengths outlined herein will alter with design. Suitably, the length of time that plant cells or plant tissue may be exposed to wavelengths used in the present invention for an effect on plant resistance levels to be observed lies in the range up to 240 minutes or longer. Preferably, the exposure is up to 100 minutes. More preferably, the exposure is up to 60 minutes, and preferably still up to 30 minutes per one-week. Typically, the level of resistance is elevated on the application of light to the plant tissue or plant cell culture over short time intervals as alluded to herein.

In a further aspect the invention can be employed on any plant tissue that is capable of responding to exposure to or irradiation with wavelengths of light as outlined herein. Preferably, the plant tissue comprises tissue that is capable of photosynthesis. Plant material that can be used in the method of the invention includes all green plants and green seeds, e.g. in greenhouse conditions (tomato, cucumber, strawberry, peas, green beans, spinach, species from the *Brassica oleracea* such as broccoli, green cabbage, red cabbage, Brussels sprouts, kohlrabi, cauliflower, white cabbage, and the like), and all plant material, such as green plant material, for example, cells comprising chlorophyll, green stems, calyx, leaves, and the like that is able to respond to wavelengths of light selected from the range 400 nm to 700 nm as herein described. Other plant material that may be treated in accordance with methods of the invention may be cells grown in plant cell cultures in bioreactors such as moss cells and tissues (e.g. protonema) from *physcomitrella patens*, and other plant cell cultures e.g. callus cell cultures, cultures of *lemnospora* species, algae or even somatic embryo clusters.

An aspect of the present invention is greenhouse plant material or plant cells obtainable by a method according to the present invention and memorizing excess light episode and as consequence having altered levels of resistance to bacterial pathogens, when compared to plant material or plant cells that have not been exposed to light of wavelengths used in the method of the present invention and kept permanently in ambient light with energy up to 100±10 μmol of photones/m$^{-2}$ s$^{-1}$.

Plant cells or plant parts may be exposed to excess light at any stage of growth so long as the growing plant cells or tissue are capable of responding to the application of light of wavelength and duration as outlined herein. In a preferred embodiment, the growing plant cells or tissue can be exposed to wavelengths of light used in the present invention from the 3 to 4 leaf stage. It is envisaged that plant cells and/or tissue of vegetables from greenhouse conditions are most usefully exposed as herein-described immediately after germination when pathogens are still not developed, particularly as preventive methods, leading to acclimation to excess light and parallel to induction plant resistance up to few days.

The artificial light source can be of any suitable conventional source, such as a light emitting diode or even a white light source comprising filters that let through light of the desired wavelength(s). The latest generation of high output LEDs, with their narrow light output wavelengths, is good choice for creating the best plant lighting. The light source may be placed at any distance from the green plant material provided that the light energy used is sufficient to influence, for example to induce or saturate oxygen evolution at the photosystem II reaction centre and/or to trigger, that is set off, a transient moderate photo-oxidative stress. Optimising of the light energy and light composition may be performed for example, by monitoring oxygen evolution and chlorophyll fluorescence using conventional methods (e.g. according to the instruction manual and software of Photon System Instruments Brno, CZ). It is preferable to locate the light source in a position which affords the greatest amount of irradiation per square unit (e.g. $cm^2$, $m^2$ etc.) of the growing plant material. Suitably, green material can be fitted with a suitable light source capable of being manually or automatically activated, for example, by employing a timing means and thereby emitting wavelengths of light as indicated herein and described herein. Alternatively, an independent container specifically designed for exposing plant parts or cells to light of wavelengths as described herein may be employed. In a further alternative, the number of light sources may be as little as one to a whole 'battery' of light sources arranged in series and/or in parallel, each light source being suitably distanced one from the other at appropriate intervals in such a manner as to effect exposure of the plant material to light of wavelengths as described herein which results in a significant alteration in the level of plant resistance to pathogen found therein by memorizing effect of excess light.

The present invention relates to a natural non-chemical method for simultaneous ameliorating of plant growth and the innate immunity (basal resistance) to a biotrophic viral, bacterial or fungal pathogens of plants cultivated in indoor growing systems. The present invention is based on discovery of the light memory in plants that is bursting innateimmunity and growth of a whole plant after incidental and transient excess light treatment of some plants organs with the selected light wavelength and/or combination of red or blue light-wavelengths once per one- or several-weeks. Application of the proposed method and apparatus will give qualitatively and quantitatively better yield in shorter time than that required in traditional indoor cultivations systems and will considerably limit or eliminate usage of chemicals for plant protection. Mature plants, fruits or plant seedlings cultivated with the use of proposed method and apparatus will be healthier, less vulnerable to different diseases and will have higher nutritional values, therefore will give higher economic output to the producers and better value for the consumers.

It is to be understood that the teaching of all references cited herein is incorporated into the instant specification.

The invention will now be described with reference to the following examples and accompanying drawing (Tables and Figures). It is to be understood that the examples and information presented in Figures are not to be viewed as limiting the scope of the invention in any way.

EXPERIMENTAL

A number of experiments have been carried out to illustrate embodiments of the invention, as follows:

Experiment 1

Plant Material: *Arabidopsis thaliana* transgenic lines with hybrid reporter gene construct ASCORBATE PEROXIDASE 1 and 2 (APX1 and APX2) promoter fused in frame with firefly LUCIFERASE (LUC) gene APX1:LUC and APX2:LUC (Karpinski et al., 1999). For experiments 5-week-old plants were used.

Light Treatments: *Arabidopsis thaliana* transgenic APX1:LUC and Col-0 rosettes were grown in ambient low-light laboratory conditions (LL, light generated by a mixture of fluorescence tubes L30W/77-fluora and 30W41-827 lumilux, (OSRAM, Berlin, Germany), with intensity of 100±20 µmol photons $m^{-2}$ $s^{-1}$, short photoperiod (9 h),) and were partially exposed to excess light (EL, 2000 µmol photons $m^{-2}$ $s^{-1}$) supplied from light-emitting diodes panels (Photon System Inst. Brno, Czech Republic). Heat emission from the light source was insignificant.

Environmental conditions: temperature 22/18° C. (day/night, respectively), relative humidity 70-80% and.

Analysis of Plant Material:

Imaging of Transgene Induction and Expression

Expression of APX1:LUC was imaged in leaves after spraying with a mist of 1 mM luciferin (Promega, Madison, Wis.). Leaves were kept in the dark for approximately 15 minutes and imaged with a Peltier-cooled charge-coupled device (CCD) camera (Wright Instruments, Enfield, UK) for a 4-min exposure to generate an image of the luminescence produced.

Chlorophyll Fluorescence Parameters

Images of the NPQ and $F_v/F_m$ were generated as described by Barbagallo et al. (2003) using a FluorImager and its associated software (Technologica, Colchester, UK) and (Photon System Inst. Brno, Czech Republic). Chlorophyll fluorescence terminology is explained in detail elsewhere (Maxwell and Johnson, 2000; Baker, 2008).

Hydrogen Peroxide Measurements

Total $H_2O_2$ content was measured in fresh plant material by a fluorometrical assay with homovanillic acid according to Ishikawa et al. (1993). Samples were homogenized in 0.6 ml of ice-cold 5% TCA and centrifuged. The reaction mixture contained the 1% supernatant, 1.25 mM homovanillic acid, 1 unit of horseradish peroxidase (Sigma), and 25 mM potassium phosphate buffer (pH 7.5). The fluorescence yield was measured at the excitation wavelength of 315 nm and emission of 425 nm Results:

Local and Systemic Responses to Excess Light are Characterized by Changes in NPQ and ROS Systemic induction of APX1:LUC (robust marker of systemic acquire acclimation) in transgenic *Arabidopsis thaliana* rosette partially exposed to excess light is evident and illustrates induction of SAA (Table 1a), (Karpinski et al., 1999). At the same time, reduction in the maximal photochemical efficiency ($F_v/F_m$) and NPQ was observed and this indicates photooxidative stress and higher dissipation of EEE as heat, in directly exposed leaves and also in leaves undergoing SAA.

Like in leaves that were undergoing SAA, systemic signals spread to other plant organs, for example, to the inflorescence steam. NPQ in inflorescence stems undergoing SAA was lower in regions where APX1:LUC induction and $H_2O_2$ levels were higher (Table 1b). These results indicate, that local and systemic induction of APX1:LUC, changes of NPQ, $F_v/F_m$, foliar levels of ROS, hormones and programmed cell death reported before (Mühlenbock et al., 2008), appear in a specific pattern. They reflect changes of NPQ (Table 1a and 1b) in such way, that zones of higher APX1:LUC expression and $H_2O_2$ levels have lower NPQ.

TABLE 1a

Acquired acclimation to excess light is spread to systemic parts of plant. In systemic leaves of rosette acclimation is characterized by wavy-like changes of APX1:LUC expression and is associated with changes in maximal photochemical efficiency ($F_v/F_m$) and foliar nonphotochemical quenching (NPQ).

|  | LL | EL-LO | EL-SY |
|---|---|---|---|
| APX1:LUC | 1.37E+09 | 6.14E+09 | 6.14E+09 |
| $F_v/F_m$ | 0.791 ± 0.006 | 0.760 ± 0.012 | 0.638 ± 0.021 |
| NPQ | 1.490 ± 0.220 | 1.050 ± 0.250 | 0.430 ± 0.100 |

Arabidopsis thaliana transgenic APX1:LUC and Col-0 rosettes were grown at low-light conditions (LL, 100 µmol photons $m^{-2} s^{-1}$) and were partially exposed to excess light (EL, 2000 µmol photons $m^{-2} s^{-1}$) for 60 min. APX1:LUC expressed as luciferase activity in relative light units (LU), maximal quantum efficiency of PSII ($F_v/F_m$) and nonphotochemical quenching (NPQ) were measured in leaves of low LL-grown rosette and in rosette that was partially exposed to EL for 60 min. EL-LO—local leaves of half of rosette that were exposed to EL, EL-SY—systemic leaves of half of EL-exposed rosette that were kept in LL.

(RL, 120 µmol photons $m^{-2} s^{-1}$ of 650±10 nm wavelength) supplied from light-emitting diodes panels (Photon System Inst. Brno, Czech Republic). The light conditions were calculated and chosen for maintenance of similar energy. Heat emission from the light source was insignificant.

Environmental conditions: temperature 22/18° C. (day/night, respectively), relative humidity 70-80% and.

Analysis of Plant Material:

Measurements of Transgene Induction and Expression

APX1:LUC induction was quantified in 3 leaves of each rosette. Collected samples (approximately 5 mg) were also grinded in 0.5 ml lysis buffer (Promega kit). About 50 µl of the soup was placed under a luminometer tube (Berthold Inst., Australia) and 50 µl of luciferin assay was injected 10 s before the measurement. Light units (LU) or relative light units (RLU) were expressed per gram fresh weight of leaves.

Plasma Membrane Electrical Potential Measurements

Electrical potential difference across the plasma membrane was measured by impaling a cell with a microelectrode, filled with 1M KCl, connected to a microelectrode preamplifier. Impalements were made using a three-dimensional micromanipulator and the tip of one microelectrode was inserted into veins of the locally treated leaves and the tip of a second electrode was placed in systemic leaves. Implementation of the microelectrode was made under 80 times magnification and number of cell layers to which the microelectrode is implemented was detected by specific changes of actually displayed electrical potential of the instrument. All experiments were performed in a chamber filled with a solid transparent silicon layer (3 mm) and with buffered solution containing 5 mM MES and 0.1 mM $CaCl_2$ (pH=6) at room temperature (22° C.-24° C.). The chamber and fiber optics were arranged in such a way that systemic part of Arabidopsis rosettes was isolated from direct light provided by optic fibers and was in the twilight zone (less than 0.1 µmol photons $m^{-2} s^{-1}$). The reference electrode (Ag/AgCl) was immersed in this solution. The light was turned on and off during the experiment, and the action potential was measured simultaneously for 30-40 min in two separated single bundle sheath cells (in two different leaves) by a coupled system of Axoclamp-2B (Axon Instruments, Union City, Calif.) and the simultaneous dual signal was recorded by the Axoscope 10.1 program.

TABLE 1b

Induction of the systemic acquired acclimation (SAA) in flowering stem of Arabidopsis thaliana rosette is characterized by wavy-like changes of APX1:LUC expression, hydrogen peroxide ($H_2O_2$) and level nonphotochemical quenching (NPQ).

|  | LL | | | | 60 min EL | | | | | 80 min EL | | | | |
|---|---|---|---|---|---|---|---|---|---|---|---|---|---|---|
| stem sector | 1 | 2 | 3 | 4 | 5 | 6 | 7 | 8 | 9 | 10 | 11 | 12 | 13 | 14 |
| APX1:LUC | 1 | 2 | 1 | 2 | 6 | 1 | 6 | 2 | 5 | 6 | 5 | 5 | 5 | 1 |
| $H_2O_2$ | 100 | 114 | 89 | 107 | 183 | 101 | 174 | 108 | 87 | 171 | 189 | 164 | 157 | 106 |
| NPQ | 1.65 | 1.49 | 1.54 | 1.38 | 0.91 | 1.39 | 0.62 | 1.56 | 0.66 | 0.52 | 0.43 | 0.45 | 0.58 | 1.43 |

Arabidopsis thaliana transgenic APX1:LUC flowering rosettes grown at low-light conditions (LL, 100 µmol photons $m^{-2} s^{-1}$) were partially exposed to excess light (EL, 2000 µmol photons $m^{-2} s^{-1}$). Luciferase activity (relative light units), hydrogen peroxide levels (relative values in comparison to sector 1 = 100%) and nonphotochemical quenching (NPQ) were measured in 1 cm sectors of the inflorescence stems (numbered as 1-14 from bottom to top of stem). APX1:LUC, $H_2O_2$ and NPQ were measured in LL-grown plant (numbers 1-4), in the inflorescence stem undergoing SAA that rosette was exposed to EL for 60 min (5-9) and in the inflorescence stem undergoing SAA that rosette was exposed to EL for 80 min (10-14).

Experiment 2

Plant Material: Arabidopsis thaliana transgenic lines with hybrid reporter gene construct ASCORBATE PEROXIDASE 1 and 2 (APX1 and APX2) promoter fused in frame with firefly LUCIFERASE (LUC) gene APX1:LUC and APX2:LUC (Karpinski et al., 1999). For experiments 5-week-old plants were used.

Light Treatments: Arabidopsis thaliana transgenic APX1:LUC and Col-0 rosettes were grown in ambient low-light laboratory conditions (LL, light generated by a mixture of fluorescence tubes L30W/77-fluora and 30W41-827 lumilux, (OSRAM, Berlin, Germany), with intensity of 200±20 µmol photons $m^{-2} s^{-1}$, short photoperiod (9 h),) and were exposed 1.5 h to excess of white light (EL, 1500 µmol photons $m^{-2} s^{-1}$), 4 h to excess of blue light (BL, 80 µmol of photons $m^{-2} s^{-1}$ of 450±10 nm wavelength) and 4 h to excess of red light Results:

Leaves Exposed to Excess Light Induced Systemic and Light Wavelength-Specific PEPS In Table is shown that excess of white and red (650±10 nm wavelength) but not blue (450±10 nm wavelength) light, of the similar energy is able to induce APX1:LUC and APX2:LUC in directly exposed leaves and in leaves undergoing SAA. Taking into consideration that these two transgenic lines are robust molecular markers of SAA (Karpinski et al., 1997; 1999; Mullineaux et al., 2000; Fryer et al., 2003; Ball et al., 2004; Chang et al., 2004) we concluded that red, but not blue light, is the main inducer of SAA.

PEPS is induced in response to condition promoting EEE and its amplitude depends on duration of excess light episode and light spectral composition. Simultaneous measurements of the plasma membrane electrical potential in cells of bundle sheath layer of central leaf vein in exposed leaves and in leaves undergoing SAA indicate that white, red and blue light induces PEPS with an action potential of approximately 25-50 mV in directly exposed leaves (FIG. 2A) and 15-30 mV in leaves undergoing SAA in the twilight zone (FIG. 2B). However, for red and blue light, we observed an opposite order of events in comparison with that observed in white light in directly exposed leaves and in leaves undergoing SAA during switching off the light.

Several seconds of excess light illumination is sufficient to induce PEPS with maximal action potential (FIG. 2C) and the propagation speed of PEPS between two different leaves is circa 0.3 cm s$^{-1}$ for switching off light and 0.2 cm s$^{-1}$ for switching on light (FIG. 3D).

Results:

Cellular Light Memory Expressed by Inhibition of Plant Disease

Plant cell is able to differentially memorize excess light incidents, spectral composition of light and effectively use this memorized information for improving their survival chances. In control plants, under low light conditions, leaves infected with the bacterial virulent and avirulent pathogen *Pseudomonas syringae* pv. tomato showed disease symptoms and progress of infection (Table 3a, b). In the case of plants infected 1 h before excess light incidents, for all wavelengths used, disease was progressing even faster than that observed in control plants. However, in plants infected 1, 8 and 24 h after EEE incidents, development of disease symptoms was effectively inhibited at all time frames of infection after excess white and red light incidents. In the case of blue light, development of disease symptoms was only effectively stopped in the case of infection made 24 h after blue light incident. Taken together, these results indicate that the order of events (infections before or after appropriate excess light

TABLE 2

Systemic acquired acclimation (SAA) is dependent on spectral composition of light. *Arabidopsis thaliana* Col-0, transgenic APX1:LUC, APX2:LUC and apx2-1 null mutant rosettes grown at low-light (LL, 100 μmol photons m$^{-2}$ s$^{-1}$).

|  |  | EL |  | BL |  | R |  |
| --- | --- | --- | --- | --- | --- | --- | --- |
|  | LL | LO | SY | LO | SY | LO | SY |
| APX1:LUC | 1.93E+09 | 5.07E+09** | 3.97E+09* | 3.07E+09 | 2.40E+09 | 7.40E+09*** | 5.48E+09** |
| APX2:LUC | 0.44E+06 | 1.84E+06*** | 0.90E+06* | 0.52E+06 | 0.49E+06 | 1.67E+06*** | 1.42E+06** |

Expression of APX1:LUC and APX2:LUC measured as luciferase activity in relative light units (LU) in LL-grown transgenic rosettes, as well as in rosettes exposed to 1.5 h of excess of white light (EL, 1500 μmol photons m$^{-2}$ s$^{-1}$), 4 h of excess of blue light (BL, 80 μmol of photons m$^{-2}$ s$^{-1}$ of 450 ± 10 nm wavelength) and 4 h of excess of red light (RL, 120 μmol photons m$^{-2}$ s$^{-1}$ of 650 ± 10 nm wavelength). The results show representative data from pooled leaf samples of 3 independent experiments expressed as mean, with bars indicating standard deviations. Significant differences in relation to plants grown at LL conditions are indicated (P ≤ 0.05*, P ≤ 0.005, P ≤ 0.001*).

Experiment 3

Plant Material: *Arabidopsis thaliana* (1.) Heynh., ecotype Col-0. For experiments 5-week-old plants were used.

Light Treatments: *Arabidopsis thaliana* rosettes were grown in ambient low-light laboratory conditions (LL, light generated by a mixture of fluorescence tubes L30W/77-fluora and 30W41-827 lumilux, (OSRAM, Berlin, Germany), with intensity of 100±20 μmol photons m$^{-2}$ s$^{-1}$, short photoperiod (9 h),) and were exposed 1.5 h to excess of white light (EL, 1500 μmol photons m$^{-2}$ s$^{-1}$), 4 h to excess of blue light (BL, 80 μmol of photons m$^{-2}$ s$^{-1}$ of 450±10 nm wavelength) and 4 h to excess of red light (RL, 120 μmol photons m$^{-2}$ s$^{-1}$ of 650±10 nm wavelength) supplied from light-emitting diodes panels (Photon System Inst. Brno, Czech Republic). The light conditions were calculated and chosen for maintenance of similar energy. Heat emission from the light source was insignificant.

Environmental conditions: temperature 22/18° C. (day/night, respectively), relative humidity 70-80% and.

Analysis of Plant Material:

Pathogen Infection

In the pathogen proliferation tests, leaves of Col-0 plants were inoculated with *Pseudomonas syringae* pv. tomato virulent DC3000 and avirulent Rpm1 strains by subepidermal injections, 1 h before, 1 h, 8 h and 24 h after exposure to excess light episodes and bacterial grow was inspected as described before (Rusterucci et al., 2001; Mühlenbock et al., 2008), 1 h, 48 h and 96 h after infection (for details see Tables legend).

incidents) is important for the cellular light memory effect and immunedefenses. When plants are infected prior to an excess light incident, bacteria could initiate a process, which can no longer be counteracted by the plant, even if excess light is provided later. It looks that bacteria can erase light memory mechanism if they succeed to infect plants before excess light incident and SAA induction.

TABLE 3a

Different cellular light memory effects on immunedefenses to bacterial virulent pathogen *P. syringae* (DC3000) after episodes of excess white, blue (450 nm wavelength) and red (650 nm wavelength) light.

|  |  | Time after infection |  |  |  |
| --- | --- | --- | --- | --- | --- |
| Light treatment |  | 1 h | 48 h | 96 h | STD for 96 h |
| LL |  | 1271 | 7947814 | 10721307 | 2884032 |
| EL | 1 h b | 2206 | 17421133 | 17387923 | 8168694 |
|  | 1 h | 2206 | 2189010 | 872862* | 93325 |
|  | 8 h | 1162 | 1622735 | 2456109* | 251188 |
|  | 24 h | 5280 | 2189010 | 346934*** | 533205 |
| BL | 1 h b | 2131 | 9555375 | 33132005 | 57540310 |
|  | 1 h | 2484 | 2693070 | 4677351 | 1954882 |
|  | 8 h | 1416 | 5067658 | 13803843 | 4168694 |
|  | 24 h | 3436 | 4680020 | 575768* | 363078 |
| RL | 1 h b | 2843 | 12029504 | 15497003 | 8912509 |
|  | 1 h | 2631 | 1319009 | 1349733 | 1047129 |

TABLE 3a-continued

Different cellular light memory effects on immunedefenses
to bacterial virulent pathogen *P. syringae* (DC3000)
after episodes of excess white, blue (450 nm wavelength)
and red (650 nm wavelength) light.

| Light treatment | | Time after infection | | |
|---|---|---|---|---|
| | 1 h | 48 h | 96 h | STD for 96 h |
| 8 h | 1338 | 3313201 | 533786* | 2884032 |
| 24 h | 2185 | 1122659 | 229217* | 4677351 |

Bacterial growth was measured 1 h, 48 h and 96 h after infections made 1 h before, 1 h, 8 h and 24 h after EL, BL and RL incidents. Bacterial growth is expressed as a colony forming unit per leaf area (cfu/cm$^{-2}$ leaf). Results from 4 independent experiments with 9 repetitions (n = 36) for each light condition are expressed as mean. Significant differences in comparison with ambient LL laboratory conditions are indicated according to Student's t-test (P ≤ 0.05*, P ≤ 0.005**).

TABLE 3b

Different cellular light memory effects on immunedefenses
to bacterial avirulent pathogen *P. syringae* (Rpm1)
after episodes of excess white, blue (450 nm wavelength)
and red (650 nm wavelength) light.

| Light treatment | | Time after infection | | |
|---|---|---|---|---|
| | | 1 h | 48 h | 96 h | STD for 96 h |
| LL | | 1442 | 107213 | 125674 | 38392 |
| EL | 1 h b | 741 | 120850 | 147379 | 56786 |
| | 1 h | 834 | 90679 | 61990 | 10238 |
| | 8 h | 2036 | 16453 | 17109 | 38392 |
| | 24 h | 1146 | 8296 | 15179** | 3390 |
| BL | 1 h b | 1066 | 118371 | 250753 | 43276 |
| | 1 h | 1474 | 130691 | 213918 | 9273 |
| | 8 h | 1535 | 49687 | 68115 | 14420 |
| | 24 h | 1248 | 16115 | 38392* | 998 |
| RL | 1 h b | 1442 | 107213 | 125674 | 75205 |
| | 1 h | 998 | 56786 | 116097* | 13400 |
| | 8 h | 1340 | 10238 | 43276** | 2088 |
| | 24 h | 2088 | 38392 | 19644*** | 1571 |

Bacterial growth was measured 1 h, 48 h and 96 h after infections made 1 h before, 1 h, 8 h and 24 h after EL, BL, RL, EB, ER and RB light incidents. Bacterial growth is expressed as a colony forming unit per leaf area (cfu/cm$^{-2}$). Results from 4 independent experiments with 9 repetitions (n = 36) for each light condition are expressed as mean. Significant differences in comparison with ambient LL laboratory conditions are indicated according to Student's t-test (P ≤ 0.05*, P ≤ 0.01, P ≤ 0.005*).

Experiment 4

Plant Material: *Arabidopsis thaliana* (1.) Heynh., ecotype Col-0. For experiments 5-week-old plants were used.

Light Treatments: *Arabidopsis thaliana* rosettes were grown in ambient low-light laboratory conditions (LL, light generated by a mixture of fluorescence tubes L30W/77-fluora and 30W41-827 lumilux, (OSRAM, Berlin, Germany), with intensity of 100±20 µmol photons m$^{-2}$ s$^{-1}$, short photoperiod (9 h),) and were exposed 1.5 h to excess of white light (EL, 1500 µmol photons m$^{-2}$ s$^{-1}$), 4 h to excess of blue light (BL, 80 µmol of photons m$^{-2}$ s$^{-1}$ of 450±10 nm wavelength) and 4 h to excess of red light (RL, 120 µmol photons m$^{-2}$ s$^{-1}$ of 650±10 nm wavelength) supplied from light-emitting diodes panels (Photon System Inst. Brno, Czech Republic). The light conditions were calculated and chosen for maintenance of similar energy. Heat emission from the light source was insignificant.

Environmental conditions: temperature 22/18° C. (day/night, respectively), relative humidity 70-80% and.
Analysis of Plant Material:
Pathogen Infection In the pathogen proliferation tests, leaves of Col-0 plants were inoculated with *Pseudomonas syringae* pv. tomato DC3000 strains by subepidermal injections, 1 h before, 1 h, 8 h and 24 h after exposure to excess light episodes and bacterial grow was inspected as described before (Rusterucci et al., 2001; Mühlenbock et al., 2008), 1 h, 48 h and 96 h after infection (for details see Tables legend).
Chlorophyll Fluorescence Parameters Chlorophyll fluorescence parameters were determined with a portable fluorescence monitoring system (FMS1) and the manufacturer's software (Hansatech, Kings Lynn, UK).
Results:
Cellular Light Memory Expressed by Changes in Maximal Photochemical Efficiency ($F_v/F_m$)

Cellular light memory is also characterized by the changes in other parameters preserved in time e.g. chlorophyll a fluorescence (Table 4). In white excess light-treated plants we observed the highest reduction of $F_v/F_m$ value 1 h after infection. 48 h and 96 h after infection $F_v/F_m$ value increased similar for white and red excess light treatment. Blue light treatment did not protect plants from photoinhibition and 96 h after infection much lower values of $F_v/F_m$ were observed.

TABLE 4

Improvement of maximum photochemical efficiency ($F_v/F_m$) by different
light treatments combined with virulent *P. siringae* infection
compared to ambient light laboratory conditions (LL line).

| Light treatment | | 1 h | 48 h | 96 h |
|---|---|---|---|---|
| | | Time after light treatment and infection | | |
| LL | | 0.823 | 0.794 | 0.779 |
| EL | 1 h b | 0.725 | 0.825 | 0.778 |
| | 1 h | 0.725 | 0.815 | 0.813 |
| | 8 h | 0.747 | 0.81 | 0.825 |
| | 24 h | 0.828 | 0.805 | 0.823 |
| BL | 1 h b | 0.849 | 0.803 | 0.788 |
| | 1 h | 0.845 | 0.814 | 0.81 |
| | 8 h | 0.849 | 0.814 | 0.8 |
| | 24 h | 0.835 | 0.826 | 0.824 |
| RL | 1 h b | 0.841 | 0.827 | 0.843 |
| | 1 h | 0.841 | 0.801 | 0.816 |
| | 8 h | 0.846 | 0.815 | 0.828 |
| | 24 h | 0.841 | 0.819 | 0.828 |
| | | Time after light treatment (non-infected) | | |
| LL | | 0.823 | 0.82 | 0.842 |
| EL | 1 h b | 0.725 | 0.84 | 0.828 |
| | 1 h | 0.725 | 0.815 | 0.832 |
| | 8 h | 0.747 | 0.838 | 0.84 |
| | 24 h | 0.828 | 0.841 | 0.838 |
| BL | 1 h b | 0.849 | 0.833 | 0.832 |
| | 1 h | 0.845 | 0.831 | 0.832 |
| | 8 h | 0.849 | 0.831 | 0.832 |
| | 24 h | 0.835 | 0.84 | 0.838 |
| RL | 1 h b | 0.841 | 0.833 | 0.832 |
| | 1 h | 0.841 | 0.821 | 0.832 |
| | 8 h | 0.846 | 0.831 | 0.832 |
| | 24 h | 0.841 | 0.84 | 0.838 |

$F_v/F_m$ was measured 1 h, 48 h and 96 h after infections made 1 h before, 1 h, 8 h and 24 h after excess of white (EL), blue (BL) and red (RL) light incidents. Moreover, $F_v/F_m$ was measured 1-96 h after excess white light treatment for non-infected plant. The results show data from 3 independent experiments and 5 repetitions (n=15) expressed as mean.

Experiment 5

Plant Material: *Arabidopsis thaliana* (1.) Heynh., ecotype Col-0. For experiments 5-week-old plants were used.

Light Treatments: *Arabidopsis thaliana* rosettes were grown in ambient low-light laboratory conditions (LL, light generated by a mixture of fluorescence tubes L30W/77-fluora and 30W41-827 lumilux, (OSRAM, Berlin, Germany), with intensity of 100±20 µmol photons m$^{-2}$ s$^{-1}$, short photoperiod (9 h),) and were exposed 1.5 h to excess of white light (EL, 1500 µmol photons m$^{-2}$ s$^{-1}$), 4 h to excess of blue light (BL, 80 µmol of photons m$^{-2}$ s$^{-1}$ of 450±10 nm wavelength) and 4 h to excess of red light (RL, 120 µmol photons m$^{-2}$ s$^{-1}$ of 650±10 nm wavelength) supplied from light-emitting diodes panels (Photon System Inst. Brno, Czech Republic). The light conditions were calculated and chosen for maintenance of similar energy. Heat emission from the light source was insignificant.

Environmental conditions: temperature 22/18° C. (day/night, respectively), relative humidity 70-80% and.

Analysis of Plant Material:

Pathogen Infection

In the pathogen proliferation tests, leaves of Col-0 plants were inoculated with *Pseudomonas syringae* pv. tomato DC3000 strains by subepidermal injections, 1 h before, 1 h, 8 h and 24 h after exposure to excess light episodes and bacterial grow was inspected as described before (Rusterucci et al., 2001; Mühlenbock et al., 2008), 1 h, 48 h and 96 h after infection (for details see Tables legend).

Chlorophyll Fluorescence Parameters

Images of the ΦPSII were generated as described by Barbagallo et al. (2003) using a FluorImager and its associated software (Technologica, Colchester, UK) and (Photon System Inst. Brno, Czech Republic). Chlorophyll fluorescence terminology is explained in detail elsewhere (Maxwell and Johnson, 2000; Baker, 2008).

Results:

Cellular Light Memory Expressed by Operating Efficiency of Photosystem II (ΦPSII)

The data indicate that excess of white and red light treatments before infection is optimal for plants protection form photoinhibition, can inhibit development of disease symptoms and reduce the bacteria growth. The highest values of ΦPSII were observed for leaves pretreated with excess of white and red light (Table 5). Plants pre-exposed to excess of blue light showed level of ΦPSII similar to that observed in low light infected plant (plant infected 24 h after light) or lower (plant infected 8 h after light).

TABLE 5

Improvement of operating efficiency of photosystem II (ΦPSII) by different light treatments combined with virulent *P. siringae* infection compared to ambient light laboratory conditions (LL).

| light | 1 h before | 1 h | 8 h | 24 h |
|---|---|---|---|---|
| LL | 0.257 ± 0,065 | | | |
| EL | 0.285 ± 0,070 | 0.270 ± 0.000 | 0.290 ± 0,014 | 0.315 ± 0.007 |
| BL | 0.280 ± 0.014 | 0.295 ± 0.007 | 0.185 ± 0.017 | 0.265 ± 0.007 |
| RL | 0,.265 ± 0.007 | 0.300 ± 0.014 | 0.258 ± 0.057 | 0.270 ± 0.023 |

ΦPSII was measured 1 h, 48 h and 96 h after infections made 1 h before, 1 h, 8 h and 24 h after excess of white (EL), blue (BL) and red (RL) light incidents. The results show data from 3 independent experiments and 5 repetitions (n = 15) expressed as mean, with standard deviations.

Experiment 6

Plant Material.

*Arabidopsis thaliana* (1.) Heynh., ecotype Col-0. For experiments 5-week-old plants were used.

Light Treatments.

*Arabidopsis thaliana* rosettes were grown in ambient low-light laboratory conditions (LL, light generated by a mixture of fluorescence tubes L30W/77-fluora and 30W41-827 lumilux, (OSRAM, Berlin, Germany), with intensity of 100±20 µmol photons m$^{-2}$ s$^{-1}$, short photoperiod (9 h),) and were exposed 1.5 h to excess of white light (EL, 1500 µmol photons m$^{-2}$ s$^{-1}$), 4 h to excess of blue light (BL, 80 µmol of photons m$^{-2}$ s$^{-1}$ of 450±10 nm wavelength) and 4 h to excess of red light (RL, 120 µmol photons m$^{-2}$ s$^{-1}$ of 650±10 nm wavelength) supplied from light-emitting diodes panels (Photon System Inst. Brno, Czech Republic). The light conditions were calculated and chosen for maintenance of similar energy. Heat emission from the light source was insignificant.

Environmental conditions: temperature 22/18° C. (day/night, respectively), relative humidity 70-80% and.

Analysis of Plant Material:

Hydrogen Peroxide Measurements

Total H$_2$O$_2$ content was measured in fresh plant material by a fluorometrical assay with homovanillic acid according to Ishikawa et al. (1993). Samples were homogenized in 0.6 ml of ice-cold 5% TCA and centrifuged. The reaction mixture contained the 1% supernatant, 1.25 mM homovanillic acid, 1 unit of horseradish peroxidase (Sigma), and 25 mM potassium phosphate buffer (pH 7.5). The fluorescence yield was measured at the excitation wavelength of 315 nm and emission of 425 nm Results:

Cellular Light Memory Expressed by Hydrogen Peroxide Changes

Different excess light incidents can be physiologically memorized by the changes in foliar H$_2$O$_2$ levels (Table 6). H$_2$O$_2$ levels were initially higher after all excess light incidents. However, 48 h and 96 h after excess light incidents, foliar H$_2$O$_2$ levels were different for all light treatments. Four days after incident of excess white light, foliar H$_2$O$_2$ level were similar to that observed in control plants from low light conditions. In the case of blue light, foliar H$_2$O$_2$ levels 96 h after light incident were significantly higher, while for the red light were significantly lower. These results are in agreement with induction of APX1:LUC and APX2:LUC by red light (Table 2).

TABLE 6

Cellular light memory of white, blue (450 nm wavelength) and red (650 nm wavelength) excess light episodes expressed by progressing in time changes of foliar hydrogen peroxide (H$_2$O$_2$) levels.

| | 1 h | 48 h | 96 h |
|---|---|---|---|
| LL | 41.0 ± 1.0 | 40.4 ± 1.2 | 41.0 ± 1.8 |
| EL | 45.1 ± 1.2 | 39.2 ± 2.0 | 37.8 ± 1.0 |
| BL | 44.5 ± 1.0 | 46.8* ± 3.0 | 48.4** ± 1.0 |
| RL | 44.3 ± 0.7 | 35.8 ± 1.0 | 30.4** ± 1.5 |

Foliar H$_2$O$_2$ levels were determined 1 h, 48 h and 96 h after appropriate excess light incidents. The results show data from 3 independent experiments and 5 repetitions (n = 15) expressed as mean, with standard deviations. Significant differences in comparison with ambient LL laboratory conditions are indicated according to Student's t-test (P ≤ 0.05*, P ≤ 0.005**).

Experiment 7

Plant Material: *Arabidopsis thaliana* (1.) Heynh., ecotype Col-0. For experiments 5-week-old plants were used.

Light Treatments: *Arabidopsis thaliana* rosettes were grown in ambient low-light laboratory conditions (LL, light generated by a mixture of fluorescence tubes L30W/77-fluora and 30W41-827 lumilux, (OSRAM, Berlin, Germany), with intensity of 100±20 µmol photons m$^{-2}$ s$^{-1}$, short photoperiod (9 h),) and were exposed 1.5 h to excess of white light (EL, 1500 µmol photons m$^{-2}$ s$^{-1}$), 4 h to excess of blue light (BL, 80 µmol of photons m$^{-2}$ s$^{-1}$ of 450±10 nm wavelength) and 4 h to excess of red light (RL, 120 µmol photons m$^{-2}$ s$^{-1}$ of 650±10 nm wavelength) supplied from light-emitting diodes panels (Photon System Inst. Brno, Czech Republic). The light conditions were calculated and chosen for maintenance of similar energy. Heat emission from the light source was insignificant.

Environmental conditions: temperature 22/18° C. (day/night, respectively), relative humidity 70-80% and.

Analysis of Plant Material:

Pathogen Infection

Leaves of Col-0 plants were inoculated with *Pseudomonas syringae* pv. tomato DC3000 and Rpm1 strains by subepidermal injections, 1 h before, 1 h, 8 h and 24 h after exposure to excess light episodes and bacterial grow was inspected as described before (Rusterucci et al., 2001; Mühlenbock et al., 2008), 1 h, 48 h and 96 h after infection (for details see Tables legend).

Salicylic Acid Content Determination

Both free and conjugated foliar SA content was determined by HPLC method in plants exposed to EL, BL and RL. Foliar SA levels were measured directly after different light treatments and compared to LL control. Foliar SA levels were also determined 1 h, 48 h and 96 h after infections with avirulent (Rpm1) *P. syringae* strains and with virulent (DC3000) in leaves inoculated 1 h, 8 h and 24 after appropriate light treatments (for details see Tables legend).

Free and bound SA levels in leaves were determined by HPLC method of Meuwly and Metraux (1993) by. Approximately 1 g of fresh tissue was ground in liquid nitrogen to a fine powder with a chilled pestle and mortar. Three milliliters of 90% methanol and 250 ng o-anisic acid (internal standard) were added to each sample. Samples were vortexed, sonicated for 20 min, and centrifuged for 20 min at 1,700 g. The supernatant was transferred to a new tube, and the pellet was reextracted with 2 ml 90% methanol. The two supernatants were combined, vacuum dried, and frozen at 80° C.; then 2.5 ml 5% trichloroacetic acid was added, and the samples were vortexed, sonicated for 5 min, and centrifuged at 1,700 g for 15 min. The supernatant was extracted twice with 2.5 ml of a 1:1 (vol/vol) mixture of ethyl acetate and cyclopentane. The organic phases were combined, vacuum dried, and frozen at 80° C. Just prior to loading of samples for high-pressure liquid chromatography, each was resuspended in 250 l of 20% methanol, vortexed, sonicated for 5 min, and filtered through a 0.22 µm nylon filter.

Results:

Cellular Plant Memory Expressed by Salicylic Acid Content Changes

Controlled levels of salicylic acid are required for optimal photosynthesis and changes of salicylic acid synthesis is indeed physiologically linked with induction of resistance to bacterial infection. Therefore accumulation of salicylic acid induced by light treatment could be one of the markers of cellular plant memory. Higher foliar bound and free SA levels were observed in excess of white and red light treated plants (Table 7a).

The highest maximal levels of free foliar SA were also observed in leaves infected with avirulent *P. syringae* 24 h after excess of white and 1, 8, 24 h after red light treatments (Table 7b). 48 h after infection free foliar SA level reach maximum and dropped after 96 h. After blue light treatment free foliar SA level was still accumulating at least 96 h after infection. Moreover, RL had the strongest effect on free SA content in plants infected with virulent bacterial strains (Table 7c). Both EL and RL treatment resulted in higher accumulation of conjugated foliar SA after inoculation. This faster induction of salicylic acid after white and red light and decrease corresponded to inhibition of bacterial growth (Table 3a, b) correlates with better induction of defense responses against bacterial strain, foliar $H_2O_2$ levels and the lowest photoinhibition.

TABLE 7a

Higher foliar free and bound SA levels is accumulated in plants treated with excess of white and red light.

|    | bound SA | free SA |
|----|----------|---------|
| LL | 66.58    | 11.29   |
| EL | 73.74    | 15.90   |
| B  | 63.40    | 12.03*  |
| R  | 92.43*   | 21.25*  |

*Arabidopsis* leaves were exposed to excess light (EL; 1500 µmol/m$^2$/s; 60 min), blue (BL; 80 µmol/m$^2$/s; 4 h) and red light (RL; 120 µmol/m$^2$/s; 4 h). Free and bound foliar SA content was determined immediately after light treatment. The results represent average of n = 5 replicates from one experiment. Significant differences in comparison with ambient LL laboratory conditions are indicated (P ≤ 0.05*).

TABLE 7b

Fast accumulation of free (but not conjugated) salicylic acid induced by excess of red light is correlated with induction of plant resistance to avirulent *P. syringae* Rpm1.

| | | | | free SA | | | | | |
|---|---|---|---|---|---|---|---|---|---|
| LL | 17.22 | 26.83 | 14.89 | | | | | | |
| | | EL | | | BL | | | RL | |
| | 1 h | 48 h | 96 h | 1 h | 48 h | 96 h | 1 h | 8 h | 24 h |
| 1 h | 60.38 | 44.00 | 9.60 | 14.41 | 38.57 | 25.38 | 40.81 | 77.39 | 18.25 |
| 8 h | 22.06 | 46.90 | 131.49 | 21.96 | 48.08 | 138.32 | 16.79 | 52.64 | 17.92 |
| 24 h | 6.86 | 67.11 | 161.24 | 16.57 | 32.67 | 90.84 | 21.01 | 179.07 | 17.71 |

TABLE 7b-continued

Fast accumulation of free (but not conjugated) salicylic acid induced by excess of red light is correlated with induction of plant resistance to avirulent *P. syringae* Rpm1.

| | | | | bound SA | | | | | |
|---|---|---|---|---|---|---|---|---|---|
| LL | 70.87 | 107.92 | 31.25 | | | | | | |
| | | EL | | | BL | | | RL | |
| | 1 h | 48 h | 96 h | 1 h | 8 h | 24 h | 1 h | 8 h | 24 h |
| 1 h | 124.31 | 148.64 | 129.77 | 59.23 | 112.70 | 165.66 | 102.74 | 141.35 | 153.61 |
| 8 h | 42.06 | 217.91 | 117.51 | 51.50 | 358.73 | 175.58 | 79.81 | 292.71 | 154.97 |
| 24 h | 25.28 | 83.143 | 82.46 | 88.08 | 104.09 | 55.17 | 84.89 | 231.88 | 98.58 |

Free and bound salicylic acid was measured 1 h, 48 h and 96 h after infections made 1 h before, 1 h, 8 h and 24 h after excess of white (EL; 1500 μmol/m²/s; 60 min), blue (BL; 80 μmol/m²/s; 4 h) and red light (RL; 120 μmol/m²/s; 4 h). The results represent average of n = 5 replicates from one experiment.

TABLE 7c

Fast accumulation of free (but not conjugated) salicylic acid induced by excess of red light is correlated with induction of plant resistance to virulent *P. syringae* D3000.

| | free SA | | | bound SA | | |
|---|---|---|---|---|---|---|
| | 1 h | 48 h | 96 h | 1 h | 48 h | 96 h |
| LL | 15.52 | 9.90 | 8.90 | 33.10 | 75.29 | 67.74 |
| EL | 14.56 | 8.79 | 9.16 | 36.52 | 153.19 | 150.11 |
| BL | 14.08 | 5.89 | 10.28 | 18.45 | 58.15 | 110.97 |
| RL | 16.94 | 21.35 | 8.07 | 34.20 | 100.86 | 125.15 |

*Arabidopsis* leaves were inoculated with virulent *P. syringae* strains D3000 1 h after exposure to excess light (EL; 1500 μmol/m²/s; 60 min), blue (BL; 80 μmol/m²/s; 4 h) and red light (RL; 120 μmol/m²/s; 4 h). Foliar free and bound SA levels were determined 1 h, 48 h and 96 h after infection in plants infected 1 h after light treatments. The results represent the average of n = 5 replicates from one experiment.

Experiment 8

Plant Material: *Arabidopsis thaliana* (1.) Heynh., ecotype Col-0 and SA deficient mutants that have disrupted SA-synthesis pathway (sid2-2) and null mutants that constitutively activate these pathways (cpr6-1, dnd1-1), allowing exploration of the relationship between the SA-mediated responses. Since GSH also plays a crucial role in plant stress response and controls cellular redox status we chose two null mutants impaired in GSH synthesis cad2 and rax1-1, with mutation in gamma glutamylcysteine synthase (GCH1) (Ball et al., 2004). For experiments 5-week-old plants were used.

Light Treatments: *Arabidopsis thaliana* rosettes were grown in ambient low-light laboratory conditions (LL, light generated by a mixture of fluorescence tubes L30W/77-fluora and 30W41-827 lumilux, (OSRAM, Berlin, Germany), with intensity of 100±20 μmol photons m$^{-2}$ s$^{-1}$, short photoperiod (9 h),) and were exposed 1.5 h to excess of white light (EL, 1500 μmol photons m$^{-2}$ s$^{-1}$), 4 h to excess of blue light (BL, 80 μmol of photons m$^{-2}$ s$^{-1}$ of 450±10 nm wavelength) and 4 h to excess of red light (RL, 120 μmol photons m$^{-2}$ s$^{-1}$ of 650±10 nm wavelength) supplied from light-emitting diodes panels (Photon System Inst. Brno, Czech Republic). The light conditions were calculated and chosen for maintenance of similar energy. Heat emission from the light source was insignificant.

Environmental conditions: temperature 22/18° C. (day/night, respectively), relative humidity 70-80% and.
Analysis of Plant Material:
Pathogen Infection Leaves of Col-0 plants were inoculated with *Pseudomonas syringae* pv. tomato DC3000 and Rpm1 strains by subepidermal injections, 1 h before, 1 h, 8 h and 24 h after exposure to excess light episodes and bacterial grow was inspected as described before (Rusterucci et al., 2001; Mühlenbock et al., 2008), 1 h, 48 h and 96 h after infection (for details see Tables legend).

Salicylic Acid Content Determination

Both free and conjugated foliar SA content was determined by HPLC method in plants exposed to EL, BL and RL. Foliar SA levels were measured directly after different light treatments and compared to LL control. Foliar SA levels were also determined 1 h, 48 h and 96 h after infections with avirulent (Rpm1) *P. syringae* strains and with virulent (DC3000) in leaves inoculated 1 h, 8 h and 24 after appropriate light treatments (for details see Figures legend).

Free and bound SA levels in leaves were determined by HPLC method of Meuwly and Metraux (1993) by. Approximately 1 g of fresh tissue was ground in liquid nitrogen to a fine powder with a chilled pestle and mortar. Three milliliters of 90% methanol and 250 ng o-anisic acid (internal standard) were added to each sample. Samples were vortexed, sonicated for 20 min, and centrifuged for 20 min at 1,700 g. The supernatant was transferred to a new tube, and the pellet was reextracted with 2 ml 90% methanol. The two supernatants were combined, vacuum dried, and frozen at 80° C.; then 2.5 ml 5% trichloroacetic acid was added, and the samples were vortexed, sonicated for 5 min, and centrifuged at $1,700_{-1g\,for}$ 15 min. The supernatant was extracted twice with 2.5 ml of a 1:1 (vol/vol) mixture of ethyl acetate and cyclopentane. The organic phases were combined, vacuum dried, and frozen at 80° C. Just prior to loading of samples for high-pressure liquid chromatography, each was resuspended in 250 l of 20% methanol, vortexed, sonicated for 5 min, and filtered through a 0.22 μm nylon filter.

Results:
Cellular Memory in SA and GSH Signaling Mutants

Resistance to *P. syringae* both virulent and avirulent strains was altered when the mutant was subject to excess of white and red light before infection (Table 8a). Especially it concerns the null mutants that constitutively activate SA-synthesis pathway (dnd1-1, Table 8c), allowing exploration of the relationship between the SA- and GSH-mediated responses. Analyses performed for SA deficient mutants that have disrupted SA-synthesis pathway (sid2-2, Table 8c) and two null mutants impaired in GSH synthesis cad2 and rax1-1, with mutation in gamma glutamylcysteine synthase (GCH1) (Ball et al., 2004) showed that bacterial growth was significantly increased.

TABLE 8a

Induction of plant resistance to avirulent *P. syringae* (Rpm1)
by excess of white and red light is controlled by DND1.

| time after infection | | col-0 | cpr6 | dnd1 | sid2 | cad2 | rax1 |
|---|---|---|---|---|---|---|---|
| LL | 1 h | 1486 | 1125 | 1659 | 1238 | 1585 | 1498 |
|  | 48 h | 216981 | 92074 | 851** | 592416 | 139182 | 102780 |
|  | 96 h | 730486 | 231854 | 21750* | 3945147* | 134896* | 267936 |
|  | STD for 96 h | 91680 | 47082 | 13199 | 1024000 | 15360 | 51200 |
| EL | 48 h | 207702 | 235539 | 6890** | 292639 | 169873 | 214126 |
|  | 96 h | 174582 | 815113 | 3800** | 1597621 | 1449089 | 237684 |
|  | STD for 96 h | 112640 | 512000 | 2349 | 153600 | 102400 | 20480 |
| BL | 48 h | 177011 | 88505 | 8267** | 785130 | 413977 | 231256 |
|  | 96 h | 2264203 | 793521 | 148386* | 5231214 | 927417 | 575143* |
|  | STD for 96 h | 307200 | 20480 | 16212 | 102400 | 502400 | 30720 |
| RL | 48 h | 249814 | 174869 | 35687 | 606691 | 349739 | 167732 |
|  | 96 h | 83467 | 670059 | 15600 | 1449089 | 1449089 | 2840216* |
|  | STD for 96 h | 51200 | 222880 | 20480 | 102400 | 102400 | 1024000 |

Wild type Col-0 and mutants: cpr6-1, dnd1-1, sid2-2, cad2, rax1-1 (in Col-0 background) leaves were inoculated with avirulent *P. syringae* strains (Rpm1) 1 h after exposures to excess light (EL; 1500 µmol/m$^2$/s; 60 min), blue (BL; 80 µmol/m$^2$/s; 4 h) or red light (RL; 120 µmol/m$^2$/s; 4 h). Bacteria growth was determined 1 h (data similar for all plants are shown only for LL, 1 h), 48 h and 96 h after infection. The results represent the average of n = 36 leaves from two independent experiments. Data were tested for significance by t test. Asterisk (*) indicates significant differences to wild type plants ($P \leq 0.05*$, $P \leq 0.01**$).

TABLE 8b

Induction of plant resistance to virulent *P. syringae* (DC3000)
by excess of white and red light is controlled by DND1.

|  | col-0 | cpr6 | dnd1 | sid2 | cad2 | rax1 |
|---|---|---|---|---|---|---|
| 1 h | 2468 | 2288 | 2511 | 1292 | 3851 | 2168 |
| 48 h | 806181 | 1242353 | 64153 | 3449143 | 2216000 | 3377143 |
| 96 h | 20070400 | 2072000* | 222000** | 29952000 | 7781818 | 40448000 |
| STD for 96 h | 7787138 | 2078352 | 58280 | 14620666 | 9198940 | 9852318 |

Wild type Col-0 and mutants: cpr6-1, dnd1-1, sid2-2, cad2, rax1-1 (in Col-0 background) leaves were inoculated with virulent *P. syringae* under LL conditions. Bacteria growth was determined 1 h, 48 h and 96 h after infection. The results represent the average of n = 36 leaves from two independent experiments. Data were tested for significance by t test. Asterisk (*) indicates significant differences to wild type plants in low light (LL) conditions ($P \leq 0.05*$, $P \leq 0.01**$).

TABLE 8c

Accumulation of foliar salicylic acid content correspond
with the reduction of virulent and avirulent bacterial
growth in *Arabidopsis* mutants.

|  | SA | | STD | |
|---|---|---|---|---|
|  | bound | free | bound | free |
| col0 | 2.042 | 0.469 | 0.959 | 0.264 |
| cpr6 | 4.027* | 0.911* | 0.002 | 0.247 |
| dnd1 | 4.534* | 0.718* | 0.536 | 0.210 |
| sid2 | 1.972 | 0.487 | 0.461 | 0.060 |
| cad2 | 1.676* | 0.456 | 0.720 | 0.123 |
| rax12 | 1.184** | 0.464 | 0.320 | 0.019 |

Free and bound foliar SA levels measured in 5-weeks-old wild type Col-0 and cpr6-1, dnd1-1, sid2-2, cad2, rax1-1 (in Col-0 background) mutants leaves from plants cultivated under LL and short photoperiod conditions. The results represents the average of n = 5 replicates. Data were tested for significance by t test. Asterisk (*) indicated significant differences to low light (LL) conditions ($P \leq 0.05*$, $P \leq 0.01**$).

Experiment 9

Plant Material: *Arabidopsis thaliana* following mutants were used: recessive npq4 mutant, kindly given by Prof. K. Niyogi Laboratory, University of California, Berkeley, Calif., USA; phot1/phot2 by Prof. M. Wada Laboratory, Kyushu University, Fukuoka Japan; phyA-211, phyB-9 from prof. E. Schäfer Laboratory, Freiburg University, Germany; and cad2 and rax1-1 null mutants deficient in GSH1 synthetase (Ball et al., 2004). For experiments 5-week-old plants were used.

Light Treatments: *Arabidopsis thaliana* rosettes were grown in ambient low-light laboratory conditions (LL, light generated by a mixture of fluorescence tubes L30W/77-fluora and 30W41-827 lumilux, (OSRAM, Berlin, Germany), with intensity of 100±20 µmol photons m$^{-2}$ s$^{-1}$, short photoperiod (9 h),) and were exposed 20 mins and 60 mins to excess of white light (EL, 1500 µmol photons m$^{-2}$ s$^{-1}$), supplied from light-emitting diodes panels (Photon System Inst. Brno, Czech Republic). Heat emission from the light source was insignificant.

Environmental conditions: temperature 22/18° C. (day/night, respectively), relative humidity 70-80% and.

Analysis of Plant Material:

Measurements of Transgene Induction and Expression

APX1:LUC induction was quantified in 3 leaves of each rosette. Collected samples (approximately 5 mg) were also grinded in 0.5 ml lysis buffer (Promega kit). About 50 µl of the soup was placed under a luminometer tube (Berthold Inst., Australia) and 50 µl of luciferin assay was injected 10 s before the measurement. Light units (LU) or relative light units (RLU) were expressed per gram fresh weight of leaves.

Results:

Local and Systemic Responses to Excess Light are Characterized by Changes in NPQ and ROS Inverse relationship of induction of APX1 and APX2 expression (robust marker of SAA), with the reduction of NPQ were confirmed by measurements of foliar APX1 and APX2 transcript levels in npq4 null mutant. Foliar transcript APX2 levels, in low light acclimated npq4 leaves, were significantly higher than those observed in control plants (Table 9) and remained unchanged during excess light episode. Foliar APX1 and APX2 transcript levels in cry1/cry2, phyA/phyB and phot1/phot2 null mutants were also pre-induced in low light, but their further induction after exposure to excess light was clear. Therefore, the presence of active CRY1 and CRY2, PHYA and PHYB, PHOT1 and PHOT2 negatively regulates APX1 and APX2 expression and light acclimatory responses, for example, due to the lack of normal chloroplast avoidance response or phenolic compounds synthesis. The absence of these responses in make mutated plants prone to low light intensities and indicate for unspecific (secondary) regulatory effect.

TABLE 9

APXs transcript levels and NPQ are unspecific deregulated in photoreceptors and npq4 null mutants.

|  |  |  | fold | STD |
|---|---|---|---|---|
| APX1:LUC |  |  |  |  |
| col-0 |  | LL | 1 | 0.4347 |
|  | 20' | EL | 2.5432 | 0.6104 |
|  | 60' | EL | 4.5575 | 1.6991 |
| cry1/cry2 |  | LL | 5.4520 | 0.3955 |
|  | 20' | EL | 4.4076 | 1.1019 |
|  | 60' | EL | 7.1744 | 1.7936 |
| phy1/phy2 |  | LL | 3.4804 | 0.8701 |
|  | 20' | EL | 5.6982 | 1.4245 |
|  | 60' | EL | 7.8714 | 1.9678 |
| phot1/phot2 |  | LL | 5.7109 | 1.4277 |
|  | 20' | EL | 7.1142 | 1.7785 |
|  | 60' | EL | 6.5405 | 1.6351 |
| npq4 |  | LL | 6.1519 | 1.5379 |
|  | 20' | EL | 7.4335 | 1.8583 |
|  | 60' | EL | 8.6651 | 2.1662 |
| APX1:LUC |  |  |  |  |
| col-0 |  | LL | 1.0000 | 0.4674 |
|  | 20' | EL | 3.0540 | 1.1784 |
|  | 60' | EL | 4.6493 | 0.3566 |
| cry1/cry2 |  | LL | 3.6450 | 0.5747 |
|  | 20' | EL | 9.5855 | 0.2190 |
|  | 60' | EL | 4.9034 | 0.6896 |
| phy1/phy2 |  | LL | 4.0719 | 0.8721 |
|  | 20' | EL | 4.7203 | 0.5598 |
|  | 60' | EL | 2.8175 | 0.3992 |
| phot1/phot2 |  | LL | 5.7952 | 0.5471 |
|  | 20' | EL | 5.6702 | 0.6708 |
|  | 60' | EL | 7.0394 | 0.9107 |
| npq4 |  | LL | 5.5976 | 1.1333 |
|  | 20' | EL | 5.9513 | 0.9197 |
|  | 60' | EL | 5.6030 | 0.4875 |

*Arabidopsis thaliana* rosettes of wild type Col-0, null mutants cad2, rax1-1 and npq4, and double null mutants cry1/cry2, phyA/phyB, phot1/phot2 grown in ambient low-light (LL) laboratory conditions (LL, 100 µmol photons $m^{-2} s^{-1}$) were exposed to excess of white light (EL, 1500 µmol photons $m^{-2} s^{-1}$).
APX1 and APX2 relative transcript level determined before and 20 minutes or 60 minutes after EL light incidents. The results show data from 3 independent experiments expressed as fold-changes in comparison to APXs foliar transcript level in LL conditions (set to 1). The mean is expressed with standard deviations.

Experiment 10

We have developed prototype of new light system based on super ultra-bright light emitting diodes (LED Lamps) composed from one sort of blue and three sorts of red light emitting (different peaks of emission) LEDs. Light intensity and photoperiod for each type of LED can be programmed and regulated continuously and separately by proper software and steering computer. Therefore spectral ratio between 450/680/700 nm light is adjustable and can mimic circadian and seasonal changes in natural light intensity and spectral quality for the corresponding wavelengths. The prototype of a basic light source unit which consists of several hundreds LEDs attached to an electronic plate have been developed and successfully tested (Table 1-3). This basic electronic plate is designed in that way that a computer can control endless chain identical units. Each LED plate emits blue and read light of total 45 W, which corresponds to traditional light source of 350-450 W strong. I would like to build system of twelfth basic LEDs units, which can be used in a green house test cultivation of economically important plants (tomato, spinach, broccoli, and others). Construction of one unit costs ca. 20 tSek. After establishing the system I will test different light programs mimicking seasonal and circadian changes in the light spectra for spring/summer time from different geographical zones (preferably Italian-Spain) and analyze growth rate, antioxidant levels, and other parameters specific for a plant and program tested.

To achieve the same or even a better growth rate, this new illumination system reduced the energy consumption by 85.5%, compared to conventional lamps (Table 1). Moreover, plants cultivated under the new light system had better growth and higher antioxidant levels, which indicates that they have an improved nutritional value.

FIG. 1 illustrates apparatus for transient excess light treatment, ozone and carbon dioxide fumigation. The apparatus comprises: probe camera and electronic unit that is monitoring photochemical efficiency of the electron transport in the photosystem II (1), red and blue light emitting diodes (LEDs) (2), ozone and carbon dioxide fumigation nuzzles (3), power control and air-cooling system for LEDs (4), ozone and carbon dioxide fumigation and supply control unit (5), computer control unit (6), electrical engines (7), wheels (8).

Figure 2:
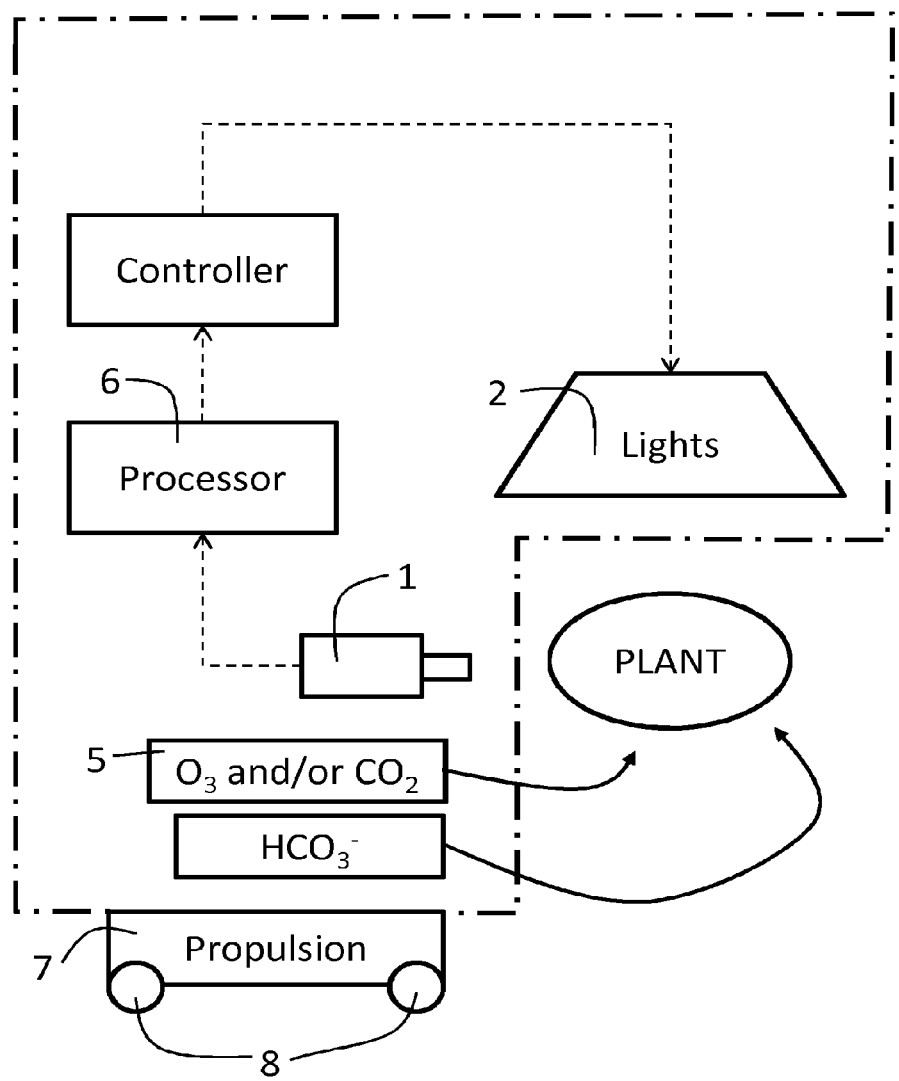
FIG. 2 shows a further schematic of such apparatus.

FIG. 2 further apparatus for transient excess light treatment, ozone, carbon dioxide and bicarbonate treatment. Elements are numbered as above.

Apparatus for induction of the cellular light memory that induce innate immunity and grow acceleration in indoor cultivated plants. The apparatus is constructed in such a way that blue and/or red light intensity is optimized in feed back electronic loop by online continuous monitoring of the photochemical electron transport efficiency ($\Phi$PSII). The control unit of the apparatus is programmed in such way that the $\Phi$PSII at given time interval is always maximized by regulated light intensity. At the same time carbon dioxide and ozone fumigation system is giving preprogrammed concentrations of these gases. Self mobility of the apparatus is designed in such way that apparatus is moving with the constant preprogrammed speed that allow treated plants to absorb preprogrammed portions of light energy in defined time interval that is sufficient to induce described light memory effect.

TABLE 1

Total foliar ascorbate content, rosette biomass and hypocotyls diameter of 6-weeks-old *Arabidopsis* plants cultivated with traditional and new light source. All other conditions temperature - 20° C., humidity - 60% and photoperiod - 9 h, were identical.

| Growth condition | Ascorbate content (mmol g$^{-1}$ FW) | Fresh weight (mg) | Dry weight (mg) | Dry matter content (%) | Hypocotyl width (mm) |
|---|---|---|---|---|---|
| Traditional light | 7.51 ± 0.36 | $^a$677 ± 346 | $^a$72 ± 28 | $^a$11.2 ± 1.5 | $^b$1128 ± 159 |
| New light system | 8.75 ± 0.42 | $^b$835 ± 186 | $^b$98 ± 14 | $^b$11.7 ± 0.7 | $^b$1285 ± 144 |

$^a$Traditional-light (350 ± 40 µmol m$^{-2}$ s$^{-1}$, generated by OSRAM Powerstar HQI-E 250 W and 450 W, Germany, total energy used for light generation during six weeks = 207.9 kWh/m$^2$)
$^b$New-light-system, (45 ± 3 µmol m$^{-2}$ s$^{-1}$, total energy used for light generation during six weeks = 30.24 kWh/m$^2$)
$^{a,b}$n = 29

References

Apel, K. and Hirt, H. (2004). Reactive oxygen species: metabolism, oxidative stress, and signal transduction. Annu. Rev. Plant. Biol. 55: 373-399.

Asada, K. (1999). The water-water cycle in chloroplasts: scavenging of active oxygens and dissipation of excess photons. Annu. Rev. Plant. Physiol. Plant. Mol. Biol. 50: 601-639.

Baker, N. R. (2008). Chlorophyll fluorescence: a probe of photosynthesis in vivo. Annu. Rev. Plant Biol. 59: 89-113.

Ball, L., Accotto, G-P., Bechtold, U., Creissen, G., Funck, D., Jimenez, A., Kular, B., Leyland, N., Mejia-Carranza, J., Reynolds, H., Karpinski, S., and Mullineaux, P. M. (2004). An *Arabidopsis* mutant with raised ASCORBATE PEROXIDASE 2 expression reveals glutathione as a direct modulator of stress responsive gene expression. Plant Cell 1: 2448-2462.

Barbagallo, R. P., Oxborough, K., Pallett, K. E., Baker, N. R. (2003). Rapid non-invasive screening for perturbations of metabolism and plant growth using chlorophyll fluorescence imaging. Plant. Physiol. 132: 485-493.

Barneche, F., Winter, V., Crèvecur M., and Rochaix, J-D. (2006). ATAB2 is a novel factor in the signalling pathway of light-controlled synthesis of photosystem proteins. EMBO Journal 25: 5907-5918.

Bellafiore, S., Barneche, F., Peltier, G. and Rochaix, J. D. (2005). State transitions and light adaptation require chloroplast thylakoid protein kinase STN7. Nature 433: 892-895.

Chang, C. C. C., Ball, L., Fryer, M., Baker, N. R., Karpinski, S., and Mullineaux, P. (2004). Induction of ASCORBATE PEROXIDASE 2 expression in wounded *Arabidopsis* leaves does not involve known wound-signalling pathways but is associated with changes in photosynthesis. Plant J. 38: 499-511.

Chang, C. C. C., Ślesak, I., Jorda, L., Sotnikov, A., Melzer, M., Miszalski, Z., Mullineaux, P. M., Parker, J. E., Karpinska, B., and Karpinski, S. (2009) *Arabidopsis* Chloroplastic Glutathione Peroxidases Play a Role in Cross Talk between Photooxidative Stress and Immune Responses. Plant Phys 150: 670-683.

Dangl, J. L., Jones, J. D. G. (2001). Plant pathogens and integrated defense responses to infection. Nature 411: 826-833.

Demming-Adams, B., Adams, W. W. (2000). Harvesting sunlight safely. Nature 403: 371-374.

Fey V., Wagner R., Brautigam K., Wirtz M., Hell R., Dietzmann A., Leister D., Oelmuller R., Pfannschmidt T. (2004). Retrograde plastid redox signals in the expression of nuclear genes for chloroplast proteins of *Arabidopsis thaliana*. J. Biol. Chem. 280: 5318-5328.

Fryer, M. J., Ball, L., Oxborough, K., Karpinski, S., Mullineaux, P. M., and Baker, N. R. (2003). Control of Ascorbate Peroxidase 2 expression by hydrogen peroxide and leaf water status during excess light stress reveals a functional organisation of *Arabidopsis* leaves. Plant J. 33: 691-705.

Galvez-Valdivieso, G., Fryer, M. J., Lawson, T., Slattery, K., Truman, W., Smirnoff, N., Asami T., Davies, W. J., Jones, A. M. J., Baker, N. R. and P. M., Mullineaux (2009). The high light response in *Arabidopsis* involves ABA signaling between vascular and bundle sheath cells. Plant Cell 21: 2143-2162.

Holt, N. E., Fleming, G. R., and Niyogi, K. K. (2004). Toward an understanding of the mechanism of nonphotochemical quenching in green plants. Biochemistry 43: 8281-8289.

Ishikawa, T., Takeda, T., Shigeoka, S., Hirayama, O., and Mitsunaga, T. (1993). Hydrogen peroxide generation in organelles of *Euglena gracilis*. Phytochemistry 33: 1297-1299.

Jabs, T., Dietrich, R. A., and Dangl, J. L. (1996). Initiation of runaway cell death in an *Arabidopsis* mutant by extracellular superoxide. Science 273: 1853-1856.

Johnson, M. P., Davison, P. A., Ruban, A. V., Horton, P. (2008). The xanthophyll cycle pool size controls the kinetics of non-photochemical quenching in *Arabidopsis thaliana*. FEBS Letters 582: 262-266.

Karpinska, B., Wingsle, G., and Karpinski, S. (2000). Antagonistic effects of hydrogen peroxide and glutathione on acclimation to excess excitation energy in *Arabidopsis*. IUBMB Life 50: 21-26.

Karpinski, S., Escobar, C., Karpinska, B., Creissen, G., and Mullineaux, P. (1997). Photosynthetic electron transport regulates the expression of cytosolic ascorbate peroxidase genes in *Arabidopsis* during excess light stress. Plant Cell 9: 627-640.

Karpinski, S., Reynolds, H., Karpinska, B., Wingsle, G., Creissen, G., and Mullineaux, P. (1999). Systemic signaling and acclimation in response to excess excitation energy in *Arabidopsis*. Science 284: 654-657.

Kowalski W. J.; Bahnfleth W. P.; Witham D. L.; Severin B. F.; Whittam T. S. (October 2000). "*Mathematical Modeling of Ultraviolet Germicidal Irradiation for Air Disinfection*". *Quantitative Microbiology* (Springer) 2 (3): 249-270. doi: 10.1023/A:1013951313398. ISSN 1388-3593.

Kruk, J. and Karpinski, S. (2006). An HPLC-based method of estimation of the total redox state of plastoquinone in chloroplasts, the size of the photochemically active plastoquinone-pool and its redox state in thylakoids of *Arabidopsis*. BBA 1757: 1669-1675.

Laloi, C., Stachowiak, M., Pers-Kamczyc, E., Warzych, E., Murgia, I. and Apel, K. (2007). Cross-talk between singlet oxygen- and hydrogen peroxide-dependent signaling of stress responses in *Arabidopsis thaliana* PNAS 104: 672-677.

Larkin R. M., Alonso J. M., Ecker J. R., Chory J. (2003). GUN4, a regulator of chlorophyll synthesis and intracellular signaling. Science 299: 902-906.

Mateo, A., Funck, D., Mühlenbock, P., Kular, B., Mullineaux, P. M. and Karpinski, S. (2006) Controlled levels of salicylic acid are required for optimal photosynthesis and redox homeostasis. J. Ex. Bot. 57: 1795-1807.

Maxwell, K., Johnson, G. N. (2000). Chlorophyll fluorescencea practical guide. J. Exp. Bot. 51: 659-668.

Meuwly P, Metraux J P. 1993. Ortho-anisic acid as internal standard for the simultaneous quantitation of salicylic acid and its putative biosynthetic precursors in cucumber leaves. Analytical Biochemistry. 214, 500-505.

Mühlenbock, P., Plaszczyca, M., Mellerowicz, E., and Karpinski, S. (2007). Lysigenous aerenchyma formation in *Arabidopsis* is controlled by LESION SIMULATING DISEASE1. Plant Cell 19: 3819-3830.

Mühlenbock, P., Szechyńiska-Hebda, M., Plaszczyca, M., Baudo, M., Mullineaux, P. M., Parker, J. E., Karpińiska, B., and Karpińiski S. (2008). Chloroplast signaling and LESION SIMULATING DISEASE1 regulate crosstalk between light acclimation and immunity in *Arabidopsis*. Plant Cell 20: 2339-2356.

Mullineaux, P., and Karpinski, S. (2002). Signal transduction in response to excess light: getting out of the chloroplast. Curr. Opin. Plant. Biol. 5: 43-48.

Mullineaux, P., Ball, L., Escobar, C., Karpinska, B., Creissen, G., and Karpinski S. (2000). Are diverse signalling pathways integrated in the regulation of *arabidopsis* antioxidant defence gene expression in response to excess excitation energy? Philos. Trans. R. Soc. Lond. B. Biol. Sci. 355: 1531-40.

Mullineaux, P. M. Karpinski, S., and Baker N. R. (2006). Spatial dependence for hydrogen peroxide-directed signaling in light-stressed plants. Plant Physiol. 141: 346-350.

Niyogi, K. K. (2000). Safety valves for photosynthesis. Curr. Opin. Plant. Biol. 3: 455-460.

Pascal, A. A., Liu, Z., Broess, K., van Oort, B., van Amerongen, H., Wang, C., Horton, P., Robert, B., Chang, W. and Ruban A. (2005). Molecular basis of photoprotection and control of photosynthetic light-harvesting. Nature 436: 134-137.

Pfannschmidt, T., Nilsson, A. and Allen, J. (1999). Photosynthetic control of chloroplast gene expression. Nature 397: 625-628.

Pfannschmidt, T., Braeutigam, K., Wagner, R., Dietzel, L., Schroeter, Y., Steiner, S, and Nykytenko, A. (2009). Potential regulation of gene expression in photosynthetic cells by redox and energy state: approaches towards better understanding Annals of Botany 103: 599-607.

Ruban, A. V., Berera, R., Ilioaia, C., van Stokkum, I. H. V. Kennis, J. T. M., Pascal, A. A., van Amerongen, H., Robert, B., Horton, P. and van Grondelle, R. (2007). Identification of a mechanism of photoprotective energy dissipation in higher plants. Nature 450: 575-578.

Rusterucci, C., Aviv, D. H., Holt III, B. F., Dangl, J. L., and Parker, J. E. (2001). The disease resistance signaling components EDS1 and PAD4 are essential regulators of the cell death pathway controlled by LSD1 in *Arabidopsis*. Plant Cell 13: 2211-2224.

Ślesak, I., Karpinska, B., Surówka, E., Miszalski, Z., Karpinski, S. (2003). Redox changes in the chloroplast and hydrogen peroxide are essential for regulation of C3-CAM transition and photooxidative stress responses in the facultative CAM plant *Mesembryanthemum crystallinum* L. Plant Cell Physiol. 44: 573-581.

Van Breusegem, F., Bailey-Serres, J. and Mittler, R. (2008). Unravelling the tapestry of networks involving Reactive Oxygen Species in plants. Plant. Phys. 147: 978-984.

The invention claimed is:

1. A method of improving the growth and/or pathogen resistance of a plant, said method comprising the step of exposing at least part of said plant to a transient period of high intensity illumination, said high-intensity illumination providing a photon flux at the plant surface having at least one of the following characteristics:
   (a) a red photon flux comprising at least 1 micromoles photons per square meter per second, said photons having a wavelength of between 600 and 700 nm;
   (b) a blue photon flux comprising at least 1 micromoles photons per square meter per second, said photons having a wavelength of between 420 and 480 nm;
   and wherein said transient period has a duration of at least 10 seconds; and wherein at least 50% of the energy of the illuminating light falls within said definitions of red photon flux and/or blue photon flux; further comprising the step of measuring one or more photosystem II efficiencies of the plant, selected from the group consisting of:
   (a) photosystem II operating efficiency (Fq'/Fm');
   (b) photosystem II maximal photochemical efficiency (Fv'/Fm'); and
   (c) photosystem II efficiency factor (Fq'/Fv'); and manipulating the photon flux to control one or more of said efficiencies to a desired level.

2. The method according to claim 1 wherein each red and blue photon flux comprises at least 10 micromoles photons per square meter per second, and preferably at least 100 micromoles photons per square meter per second.

3. The method according to claim 1 wherein at least 60%, and preferably 70%, 80%, 90% and 100% of the energy of the illuminating light falls within said definitions of red photon flux and/or blue photon flux.

4. The method according to claim 1 wherein said red photon flux comprises at least 5 and preferably 25, 50, 100, 200, 400 or 800 micromoles photons per square meter per second.

5. The method according to claim 1 wherein said blue photon flux comprises at least 10 and preferably 50, 100, 200, 400 or 800 micromoles photons per square meter per second.

6. The method according to claim 1 ,wherein said transient period has a duration of at least one minute, and preferably 5 minutes, 20 minutes, 1 hour, 2.5 hours, 5 hours or 10 hour.

7. The method according to claim 1 wherein said desired level is at least 0.2, and preferably at least 0.4, 0.6, 0.7, 0.8 or 0.9.

8. The method according to claim 1 wherein the said photo system II efficiency is measured by measurement of chlorophyll fluorescence.

9. The method according to claim 1 further comprising the step of increasing the carbon dioxide concentration surrounding the plant during said period of high intensity illumination.

10. The method according to claim 9 wherein said carbon dioxide concentration is increased to at least 0.05%, and preferably at least 0.1%, 0.125%, 0.15%, 0.2% or 0.25%.

11. The method according to claim 1 further comprising the step of increasing the HC03-ion concentration surrounding the plant roots during said period of high intensity illumination.

12. The method according to claim 11 wherein the HC03-ion concentration surrounding the plant roots during said period of high intensity illumination is raised to at least 0.5 mM, and preferably 1, 2, 4, or 8 mM.

13. The method according to claim 1 further comprising the step of increasing the ozone concentration surrounding the plant during said period of high intensity illumination.

14. The method according to claim 13 wherein said ozone concentration is increased to at least 12 ppm (parts per million), and preferably at least 25 ppm, 50 ppm, or 75 ppm.

15. The method according to claim 1 wherein the ratio of red photon flux to blue photon flux is more than 2:1.

16. The method according to claim 15 wherein the ratio of red photon flux to blue photon flux is more than 5:1 and more preferably 10:1, 20:1 or 50:1.

17. The method according to claim 1 wherein the ratio of blue photon flux to red photon flux is more than 2:1.

18. The method according to claim 17 wherein the ratio of blue photon flux to red photon flux is more than 5:1 and more preferably 10:1, 20:1 or 50:1.

19. An apparatus for performing a method according to claim 1, comprising a light source for providing said high intensity illumination; further comprising a sensor to measure the chlorophyll fluorescence of the plant, a processor to calculate at least one of said Photo system II efficiencies, and a controller to control blue and red light intensity in response to at least one of said Photo system II efficiencies.

20. The apparatus according to claim 19, further comprising a carbon dioxide delivery system.

21. The apparatus according to claim 19, further comprising a HC03-ion delivery system.

22. The apparatus according to claim 19, further comprising an ozone delivery system.

23. The apparatus according to claim 19, further comprising a propulsion system to move said apparatus relative to plants to be treated.

* * * * *